(12) United States Patent
Nie

(10) Patent No.: US 11,107,248 B2
(45) Date of Patent: Aug. 31, 2021

(54) COLOR UNMIXING WITH SCATTER CORRECTION

(71) Applicant: Ventana Medical Systems, Inc., Tucson, AZ (US)

(72) Inventor: Yao Nie, Sunnyvale, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 29 days.

(21) Appl. No.: 16/777,672

(22) Filed: Jan. 30, 2020

(65) Prior Publication Data

US 2020/0279399 A1    Sep. 3, 2020

Related U.S. Application Data

(63) Continuation of application No. PCT/EP2018/070956, filed on Aug. 2, 2018.

(60) Provisional application No. 62/541,619, filed on Aug. 4, 2017.

(51) Int. Cl.
| | |
|---|---|
| *G06T 7/90* | (2017.01) |
| *G06T 7/11* | (2017.01) |
| *G06K 9/00* | (2006.01) |
| *G06K 9/46* | (2006.01) |
| *G06T 7/00* | (2017.01) |

(52) U.S. Cl.
CPC ............ *G06T 7/90* (2017.01); *G06K 9/00147* (2013.01); *G06K 9/4652* (2013.01); *G06T 7/0014* (2013.01); *G06T 7/11* (2017.01); *G06T 2207/10024* (2013.01); *G06T 2207/10056* (2013.01); *G06T 2207/20212* (2013.01); *G06T 2207/30024* (2013.01)

(58) Field of Classification Search
CPC .......... G06T 7/90; G06T 7/11; G06T 7/0014; G06T 2207/10024; G06T 2207/10056; G06T 2207/20212; G06T 2207/30024; G06T 7/0012; G06T 5/003; G06K 9/00147; G06K 9/4652
USPC .......................................................... 382/162
See application file for complete search history.

(56) References Cited

U.S. PATENT DOCUMENTS

| | | | |
|---|---|---|---|
| 8,948,488 B2 * | 2/2015 | Can ........................ G06T 5/004 382/133 |
| 2011/0057946 A1 * | 3/2011 | Yamamoto ........... G06K 9/4652 345/589 |
| 2014/0314301 A1 * | 10/2014 | Azar ..................... G06T 7/0012 382/133 |

(Continued)

OTHER PUBLICATIONS

Astola L., Stain separation in digital bright field histopathology, Stain separation in digital bright field histopathology, Dec. 12, 2016, 1-6, XP033043752, DOI: 10.1109/IPTA.2016.7820956, Eindhoven University of Technology, WO.

(Continued)

*Primary Examiner* — Ali Bayat
(74) *Attorney, Agent, or Firm* — Ventana Medical Systems, Inc.

(57) ABSTRACT

The present disclosure provides systems and methods for separating colors in an image by automatically selecting color reference vectors that take into consideration the effect of light scattering, and principally how the light scattering changes the proportions of RGB channel signals in detected light at varying stain concentrations.

20 Claims, 18 Drawing Sheets

(56) References Cited

U.S. PATENT DOCUMENTS

2017/0206655 A1* 7/2017 Chen .................. G06T 7/90
2018/0260609 A1* 9/2018 Georgescu ............ G06T 7/0012

OTHER PUBLICATIONS

Haub Peter et al., A model based survey of colour deconvolution in diagnostic bright-field microscopy: Error estimation and spectral consideration, A model based survey of colour deconvolution in diagnostic brightheld microscopy: Error estimation and spectral consideration, Jul. 30, 2015, XP055523711, DOI: 10.1038, 5 n. 1, Scientific Reports, WO.

International Search Report and Written Opinion, dated Nov. 15, 2018, in corresponding PCTEP2018070956 filed Aug. 2, 2018, pp. 1-13.

Lorsakul Auranuch et al., Validation of multiplex immunohistochemistry assays using automated image analysis, Validation of multiplex immunohistochemistry assays using automated image analysis, Mar. 6, 2018, p. 105810J-105810J, XP060104327, ISSN 1605-7422, DOI 10.1117/12.2293168, ISBN 978-1-5106-0027-0, 10581, Roche Tissue Diagnostics, WO.

McCann M. et al., Algorithm and benchmark dataset for stain separation in histology images, Algorithm and benchmark dataset for stain separation in histology images, Oct. 27, 2014, 3953-3957, XP032967371, DOI 10.1109/ICIP.2014.7025803, IEEE, Int. conference on image processing (ICIP), WO.

Nie Y. et al, Color deconvolution method with DAB scatter correction for bright field image analysis, Mar. 6, 2018, p105810K-105810K, XP060104328, ISSN 1605-7422, DOI 10.1117/12.2293576, ISBN 978-1-5106-0027-0, 10581, Medical Systems Inc. et al., WO.

* cited by examiner

CC20

RW7213

GP2D

COLO320DM    C99

VACO4s

Slide 1

SKCO1

COLO678    LOVO

SW1222

HT29    HDC111

Slide 2

*Thumbnail image of the two slides which hold the 12 tumor cell line samples*

COLOR UNMIXING WITH SCATTER CORRECTION

CROSS-REFERENCE TO RELATED APPLICATIONS

This patent application is a continuation of International Patent Application No. PCT/EP2018/070956 filed Aug. 2, 2018, which claims priority to and the benefit of U.S. Provisional Application No. 62/541,619, filed Aug. 4, 2017. Each of the above patent applications is incorporated herein by reference as if set forth in its entirety.

BACKGROUND OF THE DISCLOSURE

In the analysis of biological specimens such as tissue sections, blood, cell cultures and the like, biological specimens are stained with one or more fluorophores or chromogens, and subsequently scanned or photographed for analysis. Observing the signals generated from the scan enables a variety of processes, including diagnosis of disease, assessment of response to treatment, and development of new drugs to fight disease. An assay includes biological specimens such as tissue sections from human subjects that are treated with a stain containing a fluorophore or chromogen conjugated to an antibody which binds to protein, protein fragments, or other targets in the specimen. Upon scanning the assay, multiple channels of image data including color channels are derived, with each observed channel comprising a mixture of multiple signals.

Multiplex immunohistochemistry (IHC) staining is a technique for the detection of multiple biomarkers within a single tissue section and has become popular due to its significant efficiencies and the rich diagnostic information it contains. A multiplex IHC slide has the potential advantage of simultaneously identifying multiple biomarkers in one tissue section as opposed to single biomarker labeling in multiple slides. Therefore, it is often used for the simultaneous assessment of multiple hallmarks of cancerous tissue.

Generally, color separation (or spectral unmixing) is used to determine a concentration of specific stains within an observed channel or channels of an assay. This may also be known as color de-convolution. The unmixing process extracts stain-specific channels to determine local concentrations of individual stains using color reference vectors, or reference spectra, that are well-known for standard types of tissue and stain combinations. Each pixel of a scanned image is represented by a vector of image values, or a color vector, and each stain corresponds to a color reference vector. The local concentration of the stain is represented by a scaling factor of a color reference vector. Therefore, the color vector for a pixel that contains multiple co-located stains with different concentrations is a linear combination of the reference spectra of all the present stains. Typically, fluorescence imaging color channels directly provide the image vector and reference spectra. In brightfield (transmission) imaging, light intensities emitted by the stained tissue are transformed into an optical density space, with mixing of different stains being represented by a linear weighted combination of the contributing reference spectra.

BRIEF SUMMARY OF THE DISCLOSURE

The present disclosure is directed to digital pathology systems and methods for unmixing acquired images of a biological sample. The systems and methods disclosed herein take into consideration the effects of light scattering and specifically how, at varying stain concentrations, light scattering changes the proportions of RGB channel signals in detected light.

As noted herein, histochemical staining is used to enhance the visual contrast of cell and tissue samples and highlight specific antigens present within cells. This is commonly achieved by embedding absorbing dyes into the sample material. To highlight multiple specific cell and tissue structures within a sample, multiple stains with different spectral absorption characteristics are deployed (i.e. multiplexing). Unfortunately, some of the most commonly used dyes, such as 3,3'-diaminobenzidine (DAB), are broadly absorbing. This presents challenges when attempting to interpret the diagnostic information provided by the contrast of individual stains. Thus, reconstruction of the single stain contrast from a multiplexed sample is highly desired.

Without wishing to be bound by any particular theory, it is believed that the Beer-Lambert equation assumes small stain concentrations and no interaction between the absorbing molecules. In other words, it is assumed that the absorption factors for each of the R, G, B, channels are the only factors to impact light extinction, which are independent of stain concentration. This assumption, however, does not hold well for DAB due to its precipitate-forming reaction during sample processing. Besides absorption, scattering also contributes to the light extinction process which causes a non-linear relation between the optical density value and the stain amount. In view of this, it is believed that DAB presents different chromatic properties at different concentrations.

Accordingly, Applicants have developed a method of selecting an optimal color reference vector for a concentration-dependent stain for use in unmixing acquired multi-spectral image data, wherein the optimal color reference vector for the concentration-dependent stain is selected from a set of color reference vectors for the concentration-dependent stain, each color reference vector within the set of color reference vectors describing or characterizing the concentration-dependent stain at a different concentration level (e.g. 1×, 2×, 4×, 8×, etc.). In this regard, Applicants have developed a method of automatically selecting a color system for unmixing that takes into account the effects of the concentration of the concentration-dependent stain within the biological sample to its contribution to each of the R, G, B channels in detected light. As such, the systems and methods described herein allow for the selection of a color reference vector that best characterizes the concentration level of the concentration-dependent stain within the biological sample. Applicants have shown that unmixing with the presently described systems and methods provides for more accurate concentration-dependent stain intensities as compared with other unmixing methods that do not take into consideration the concentration of the stain in the biological sample.

Accordingly, in one aspect of the present disclosure is a method of unmixing an image of a biological specimen comprising: (a) acquiring an image of the biological specimen stained with at least first and second stains, wherein at least one of the first and second stains is a concentration-dependent stain; (b) deriving total optical density values for each channel in R, G, B color space from pixel intensity values in the acquired image; (c) obtaining a series of color reference vectors for each of the first and second stains, where for any concentration dependent stain a plurality of concentration reference vectors are obtained, each individual concentration-dependent stain color reference vector within the set of the plurality of concentration-dependent stain color reference vectors characterizing the concentration-dependent stain at a different concentration level; (d) deriving a series of candidate color systems from the first stain and second stain color reference vectors, wherein each candidate color system comprises a first and second stain color reference vector, and where each candidate color system comprises a different pairing of first and second stain color reference vectors from the series of obtained color reference vectors; (e) selecting an optimal color system from the series of candidate color system, the optimal color system selected by (i) computing a reconstruction error for each candidate color space, and (ii) determining the candidate color space having a minimal reconstruction error; and (f) unmixing the acquired image using the selected optimal color system. In some embodiments, each candidate color system is different, with each candidate color system comprising a different color reference vector for a concentration-dependent stain.

In some embodiments, the first stain is a concentration-dependent stain (e.g. DAB) and the second stain is a concentration-independent stain (e.g. hematoxylin). In some embodiments, each candidate color system comprises a prospective color reference vector of a concentration-dependent stain, and a color reference vector for a concentration-independent stain. In some embodiments, the first stain is DAB. In some embodiments, the first stain is DAB and the second stain is hematoxylin.

In some embodiments, the biological sample is stained with two stains. In some embodiments, the biological sample is stained with more than two stains, and the acquired image (or received image data) represents a portion of the entire biological sample or a portion of a larger image of the biological sample, the acquired image having only two stains.

In another aspect of the present disclosure is a method of unmixing an image of a biological specimen comprising: acquiring an image of the biological specimen stained with first and second stains, wherein at least the first stain is a concentration-dependent stain; deriving total optical density values for each channel in R, G, B color space from pixel intensity values in the acquired image; obtaining a plurality of prospective first stain color reference vectors, each of the plurality of prospective first stain color reference vectors characterizing the first stain at a different concentration; obtaining at least one second stain color reference vector; deriving a series of candidate color systems from the first stain and second stain color reference vectors, each candidate color system comprising one of the prospective first stain color reference vectors from the plurality of prospective first stain color reference vectors and at least one (1) second stain color reference vector; selecting an optimal color system from the series of candidate color system, the optimal color system selected by (i) computing a reconstruction error for each candidate color space, and (ii) determining the candidate color space having a minimal reconstruction error; and unmixing the acquired image using the selected optimal color system.

In some embodiments, the reconstruction error is determined by calculating an absolute difference between (a) the derived total optical density value for a first of the channels in R, G, B color space, and (b) a reconstructed total optical density for the first channel (e.g. a blue channel) (see, for example, Equation (4) herein). In some embodiments, the reconstructed total optical density for the first channel is calculated by summing (i) a product of a derived amount of the second stain present in the biological sample and an optical density value for the first channel for the second stain in one of the candidate color systems of the series of candidate color systems; and (ii) a product of a derived amount of the first stain present in the biological sample and an optical density value for the first channel for first stain in the same candidate color system (see, for example, Equation (3) herein). In some embodiments, the derived amounts of the first stain and the second stain are computed by multiplying a vector of the derived total optical densities for the second and third channels in the R, B, G, color space (e.g. the green and red channels) by an inverse of a candidate reconstruction matrix, the candidate reconstruction matrix comprising (i) a first optical density vector having optical density values corresponding to the second and third channels of the first stain for the candidate color system; and (ii) a second optical density vector having optical density values corresponding to the second and third channels of the second stain for the candidate color system (see, for example, Equation (2) herein).

In some embodiments, the first stain is DAB. In some embodiments, the second stain is any dye used in standard immunohistochemical practice. In some embodiments, the second stain is any concentration-independent dye used in standard immunohistochemical practice. In some embodiments, the second stain is selected from the group consisting of hematoxylin, eosin, fast red or methyl green. In some embodiments, both the first and second stains are concentration-dependent stains, and the at least one second stain color reference vector is a set of prospective color reference vectors for the second concentration-dependent stain. In some embodiments, the first of the channels in R, G, B, color space is a blue channel or a green channel. In some embodiments, the biological sample is stained with more than two stains, and where the acquired image is a region of interest derived from a larger image, the region of interest comprising only the first and second stains. In some embodiments, the biological sample is stained with more than two stains, and where the acquired image is a portion of a larger image, the image portion comprising signals corresponding to only two colocalized stains, at least one of the two colocalized stains being a concentration-dependent stain.

In another aspect of the present disclosure is a method of unmixing an image of a biological specimen comprising: acquiring an image of the biological specimen stained with first and second stains, wherein both the first and second stains are concentration-dependent stains (e.g. DAB); deriving total optical density values for each channel in R, G, B color space from pixel intensity values in the acquired image; obtaining a plurality of prospective first stain color reference vectors from a spectral reference database, each of the plurality of prospective first stain color reference vectors characterizing the first stain at a different concentration; obtaining a plurality of prospective second stain color reference vectors from the spectral reference database, each of the plurality of prospective second stain color reference vectors characterizing the second stain at a different concentration; derive a series of candidate color systems from the first stain and second stain color reference vectors, each candidate color system comprising one of the prospective first stain color reference vectors from the plurality of prospective first stain color reference vectors and one of the prospective second stain color reference vectors from the plurality of prospective second stain color reference vectors; selecting an optimal color system from the series of candidate color system, the optimal color system selected by (i) computing a reconstruction error for each candidate color space, and (ii) determining the candidate color space having a minimal reconstruction error; and unmixing the acquired image using the selected optimal color system.

In another aspect of the present disclosure is a method of unmixing an image of a biological specimen comprising: acquiring an image of the biological specimen stained with DAB and hematoxylin (HEM); deriving total optical density values for each channel in R, G, B color space from pixel intensity values in the acquired image; obtaining a plurality of prospective DAB color reference vectors, each of the plurality of prospective DAB color reference vectors characterizing DAB at a different concentration; obtaining a HEM color reference vector; deriving a series of candidate color systems from the DAB and HEM color reference vectors, each candidate color system comprising one of the prospective DAB color reference vectors from the plurality of prospective DAB color reference vectors and the HEM color reference vector; selecting an optimal color system from the series of candidate color system that best represents the true DAB concentration level in the biological sample, the optimal color system selected by (i) computing a reconstruction error for each candidate color space, and (ii) determining the candidate color space having a minimal reconstruction error; and unmixing the acquired image using the selected optimal color system.

In another aspect of the present disclosure is an imaging system for unmixing an image of a biological specimen stained with at least two stains, the imaging system comprising: (i) an image acquisition device, (ii) one or more processors, and (iii) a memory coupled to the processor, the memory to store computer-executable instructions that, when executed by the one or more processors, cause the one or more processors to perform operations comprising: acquiring an image of the biological sample having signals corresponding to a first stain and a second stain, wherein at least the first stain is a concentration-dependent stain; total optical density values for each channel in R, G, B color space from pixel intensity values in the acquired image; obtaining a set of prospective first stain color reference vectors from a spectral reference database, each color reference vector within the set of prospective first stain color reference vectors characterizing the first stain at a different concentration; obtaining at least one second stain color reference vector from the spectral reference database; deriving a series of candidate color systems from the first stain and second stain color reference vectors, each candidate color system comprising one of the prospective first stain color reference vectors from the plurality of prospective first stain color reference vectors and the at least one second stain color reference vector; an optimal color system from the series of candidate color system, the optimal color system selected by (i) computing a reconstruction error for each candidate color space, and (ii) determining the candidate color space having a minimal reconstruction error; and unmixing the signals within the acquired image using the selected optimal color system. In some embodiments, the imaging apparatus is a multi-spectral imaging apparatus. In some embodiments, the first stain is DAB. In some embodiments, the second stain is hematoxylin. In some embodiments, the first stain is DAB and the second stain is hematoxylin.

In some embodiments, the reconstruction error is determined by calculating an absolute difference between (a) the derived total optical density value for a first of the channels in R, G, B color space, and (b) a reconstructed total optical density for the first channel. In some embodiments, the reconstructed total optical density for the first channel is calculated by summing (i) a product of a derived amount of the second stain present in the biological sample and a first channel optical density value for the second stain in one of the candidate color systems of the series of candidate color systems; and (ii) a product of a derived amount of the first stain present in the biological sample and a first channel optical density value for first stain in the same candidate color system. In some embodiments, the derived amounts of the first stain and the second stain are computed by multiplying a vector of the derived total optical densities for the second and third channels in the R, B, G, color space by an inverse of a candidate reconstruction matrix, the candidate reconstruction matrix comprising (i) a first optical density vector having optical density values corresponding to the second and third channels of the first stain for the candidate color system; and (ii) a second optical density vector having optical density values corresponding to the second and third channels of the second stain for the candidate color system.

In some embodiments, the obtaining of the set of prospective first stain color reference vectors comprises deriving a plurality of color reference vectors for the first stain by analyzing image data from a series of control slides, wherein each control slide has a different stain concentration.

In another aspect of the present disclosure is non-transitory computer-readable medium for storing computer-executable instructions that are executed by a processor to perform operations comprising: deriving total optical density values for each channel in R, G, B color space from pixel intensity values in an image or a portion of an image having a first stain and a second stain, wherein the first stain is a concentration-dependent stain and the second stain is a concentration-independent stain; obtaining a plurality of prospective first stain color reference vectors, each of the plurality of prospective first stain color reference vectors characterizing the first stain at a different concentration; obtaining a second stain color reference vector; deriving a series of candidate color systems from the first stain and second stain color reference vectors, each candidate color system comprising one of the prospective first stain color reference vectors from the plurality of prospective first stain color reference vectors and the second stain color reference vector; selecting an optimal color system from the series of candidate color system, the optimal color system selected by (i) computing a reconstruction error for each candidate color space, and (ii) determining the candidate color space having a minimal reconstruction error; and unmixing the acquired image using the selected optimal color system.

In some embodiments, the reconstruction error is determined by calculating an absolute difference between (a) the derived total optical density value for a first of the channels in R, G, B color space (e.g. a blue channel), and (b) a reconstructed total optical density for the first channel (e.g. the blue channel). In some embodiments, the reconstructed total optical density for the first channel (e.g. the blue channel) is calculated by summing (i) a product of a derived amount of the second stain present in the biological sample and a first channel optical density value (e.g. the blue channel optical density value) for the second stain in one of the candidate color systems of the series of candidate color systems; and (ii) a product of a derived amount of the first stain present in the biological sample and a first channel optical density value (e.g. the blue channel optical density value) for first stain in the same candidate color system. In some embodiments, the derived amounts of the first stain and the second stain are computed by multiplying a vector of the derived total optical densities for the second and third channels in the R, B, G, color space by an inverse of a candidate reconstruction matrix, the candidate reconstruction matrix comprising (i) a first optical density vector having optical density values corresponding to the second and third channels of the first stain for the candidate color system; and (ii) a second optical density vector having optical density values corresponding to the second and third channels of the second stain for the candidate color system.

BRIEF DESCRIPTION OF THE FIGURES

The patent or application file contains at least one drawing executed in color. Copies of this patent or patent application publication with color drawing(s) will be provided by the Office upon request and payment of the necessary fee.

For a general understanding of the features of the disclosure, reference is made to the drawings. In the drawings, like reference numerals have been used throughout to identify identical elements.

DETAILED DESCRIPTION

Figure 1:
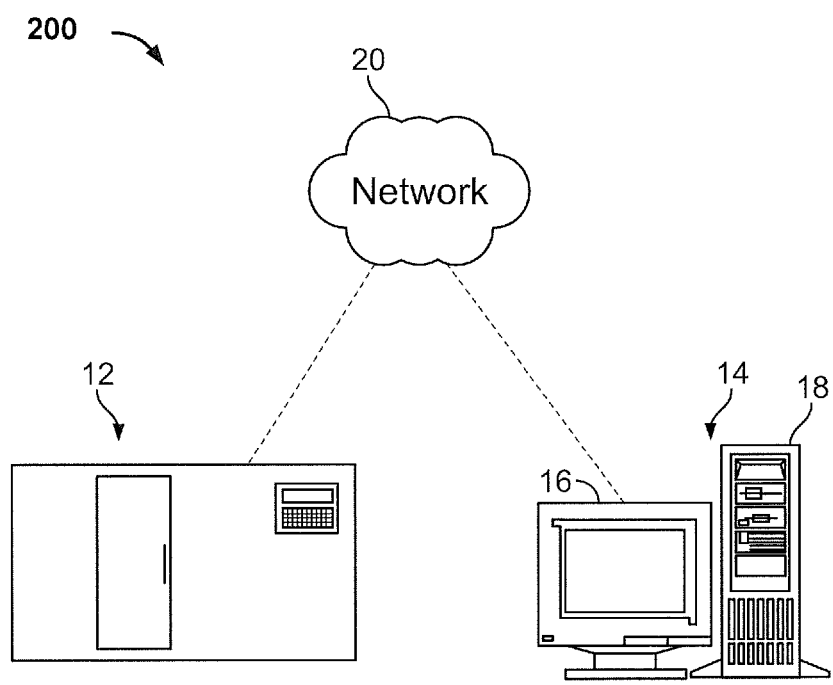
FIG. 1 illustrates a representative digital pathology system including an image acquisition device and a computer system.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "biomarker" refers to a biological molecule found in blood, other body fluids, or tissues that is a sign of a normal or abnormal process, or of a condition or disease (such as cancer). A biomarker may be used to determine how well the body responds to a treatment for a disease or condition or if the subject is predisposed to a disease or condition. In the context of cancer, a biomarker refers to a biological substance that is indicative of the presence of cancer in the body. A biomarker may be a molecule secreted by a tumor or a specific response of the body to the presence of cancer. Genetic, epigenetic, proteomic, glycomic, and imaging biomarkers can be used for cancer diagnosis, prognosis, and epidemiology. Such biomarkers can be assayed in non-invasively collected biofluids like blood or serum. Several gene and protein based biomarkers have already been used in patient care including but, not limited to, AFP (Liver Cancer), BCR-ABL (Chronic Myeloid Leukemia), BRCA1/BRCA2 (Breast/Ovarian Cancer), BRAF V600E (Melanoma/Colorectal Cancer), CA-125 (Ovarian Cancer), CA19.9 (Pancreatic Cancer), CEA (Colorectal Cancer), EGFR (Non-small-cell lung carcinoma), HER-2 (Breast Cancer), KIT (Gastrointestinal stromal tumor), PSA (Prostate Specific Antigen), S100 (Melanoma), and many others. Biomarkers may be useful as diagnostics (to identify early stage cancers) and/or prognostics (to forecast how aggressive a cancer is and/or predict how a subject will respond to a particular treatment and/or how likely a cancer is to recur).

As used herein, the term "color channel" refers to a channel of an image sensor. For example, the image sensor may have three color changes, such as red (R), green (G), and blue (B).

As used herein, the term "field of view (FOV)" refers to an image portion that has a predetermined size and/or shape.

As used herein, the term "image data" as understood herein encompasses raw image data acquired from the biological tissue sample, such as by means of an optical sensor or sensor array, or pre-processed image data. In particular, the image data may comprise a pixel matrix.

A "multi-channel image" as understood herein encompasses a digital image obtained from a biological tissue sample in which different biological structures, such as nuclei and tissue structures, are simultaneously stained with specific fluorescent dyes, quantum dots, chromogens, etc., each of which fluoresces or are otherwise detectable in a different spectral band thus constituting one of the channels of the multi-channel image.

As used therein, the term "RGB color space" refers to any additive color space based on the red-green-blue (RGB) color model. A particular RGB color space is defined by the three chromaticities of the red, green, and blue additive primaries, and can produce any chromaticity that is the triangle defined by those primary colors. The complete specification of an RGB color space also requires a white point chromaticity and a gamma correction curve.

An "unmixed image" as understood herein encompasses a grey-value or scalar image obtained for one channel of a multi-channel image. By unmixing a multi-channel image one unmixed image per channel is obtained.

Overview

The present disclosure provides systems and methods for separating colors in an image by automatically selecting color reference vectors that take into consideration the effect of light scattering, and principally how the light scattering changes the proportions of RGB channel signals in detected light at varying stain concentrations. As such, the present disclosure provides methods of optimizing the selection of color reference vectors by taking into consideration an amount of stain present in the biological sample, and this is especially important for stains that do not strictly follow the Beer-Lambert law, i.e. for stains where there is little or no a linear relationship between the concentration of the stain and its absorbance, or optical density. For these types of stains, different stain concentrations result in different spectral shapes, and hence the selection of a best color reference vector for these stains may be concentration dependent.

The methods disclosed herein are relevant for unmixing image data having signals corresponding to two stains, at least one of which is a concentration-dependent stain, e.g. DAB. By no means does this imply that biological samples may be stained with only two stains. Indeed, any biological sample being evaluated using the systems and methods described herein may be stained with more than two stains, e.g. three or more stains, or four or more stains. The systems and methods described herein are adapted to evaluate an entire image (for a biological sample stained with only two stains), a portion, field-of-view (FOV) or region of interest (ROI) of an image (e.g. a larger image) having only two stains, or any area within the image, FOV, or ROI having two colocalized stains.

With this in mind, as used herein, the term "concentration dependent stain" refers to a stain that does not strictly adhere to the Beer-Lambert law (which assumes small stain concentrations and no interaction between the absorbing molecules). For these concentration dependent stains, as the concentration of the stain increases, the proportions of R, G, B, channel signals in the detected light change due to increased scattering (such as caused by precipitation of stain molecules). For these types of stains, different optical density color reference vectors (determined at a plurality of varying stain concentrations) are utilized to best characterize the concentration-dependent nature of the stains, i.e. different color reference vectors determined at varying stain concentrations should be considered when selecting a color reference vector such that the effects of stain concentration are accounted for in the contributions of each of the R, G, and B channel signals in detected light. In some embodiments, color reference vectors for concentration-dependent stains are derived by analyzing standardized samples at varying stain concentrations and the derived amounts may be stored in a memory (201) or a database for retrieval.

For example, 3,3'-Diaminobenzidine ("DAB") is susceptible to the formation of precipitates, which causes light scattering, i.e. absorption in addition to scattering, and thus is a concentration-dependent stain. The effect of the concentration of the DAB stain is further illustrated in Example 1 herein. As a result of the concentration-dependent nature of DAB, different color reference vectors should be considered when unmixing DAB. By way of example, rather than have a single color reference vector describing DAB, a plurality of different color reference vectors may be obtained for DAB, with each individual color reference vector of the plurality of different color reference vectors describing DAB at a particular concentration level (e.g. 1×, 2×, 4×, 8×, etc.). The plurality different color reference vectors for the varying DAB concentration levels may be obtained according to methods known to those of ordinary skill in the art and further described in the Examples provided herein.

As used herein, the terms "concentration independent stains" refers to those stains that adhere or substantially adhere to the Beer-Lambert law. For these concentration independent stains, a single color reference vector may adequately describe each R, G, B color channel value.

While certain examples disclosed herein refer to a two-stain system comprising the stains DAB and hematoxylin, the skilled artisan will appreciate that DAB or, for that matter, any concentration-dependent stain, may be combined with any other concentration-independent stain or concentration dependent stain. The mathematical principals and relationships described herein will apply equally to those other stain systems as well.

A digital pathology system 200 for imaging and analyzing specimens is illustrated in FIG. 1. The digital pathology system 200 may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory 602, a computer storage medium, a computer program or set of instructions (e.g. where the program is stored within the memory or storage medium), a processor (including a programmed processor), and/or the like. The computing system 14 illustrated in FIG. 1 may comprise a computer with a display device 16 and an enclosure 18. The computer system can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, microscopes, other imaging systems, automated slide preparation equipment, etc. Some of these additional components and the various computers, networks, etc. that may be utilized are described further herein.

In general, the imaging apparatus 12 (or other image source including pre-scanned images stored in a memory) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, an image scanning systems, such as an iSCAN CORE by VENTANA MEDICAL SYSTEMS of Tucson, Ariz. or other suitable imaging equipment. Additional imaging devices and systems are described further herein. The skilled artisan will appreciate that the digital color image acquired by the imaging apparatus 12 is conventionally composed of elementary color pixels. Each colored pixel is coded over three digital components, each comprising the same number of bits, each component corresponding to a primary color, generally red, green or blue, also denoted by the term "RGB" components.

Figure 2:
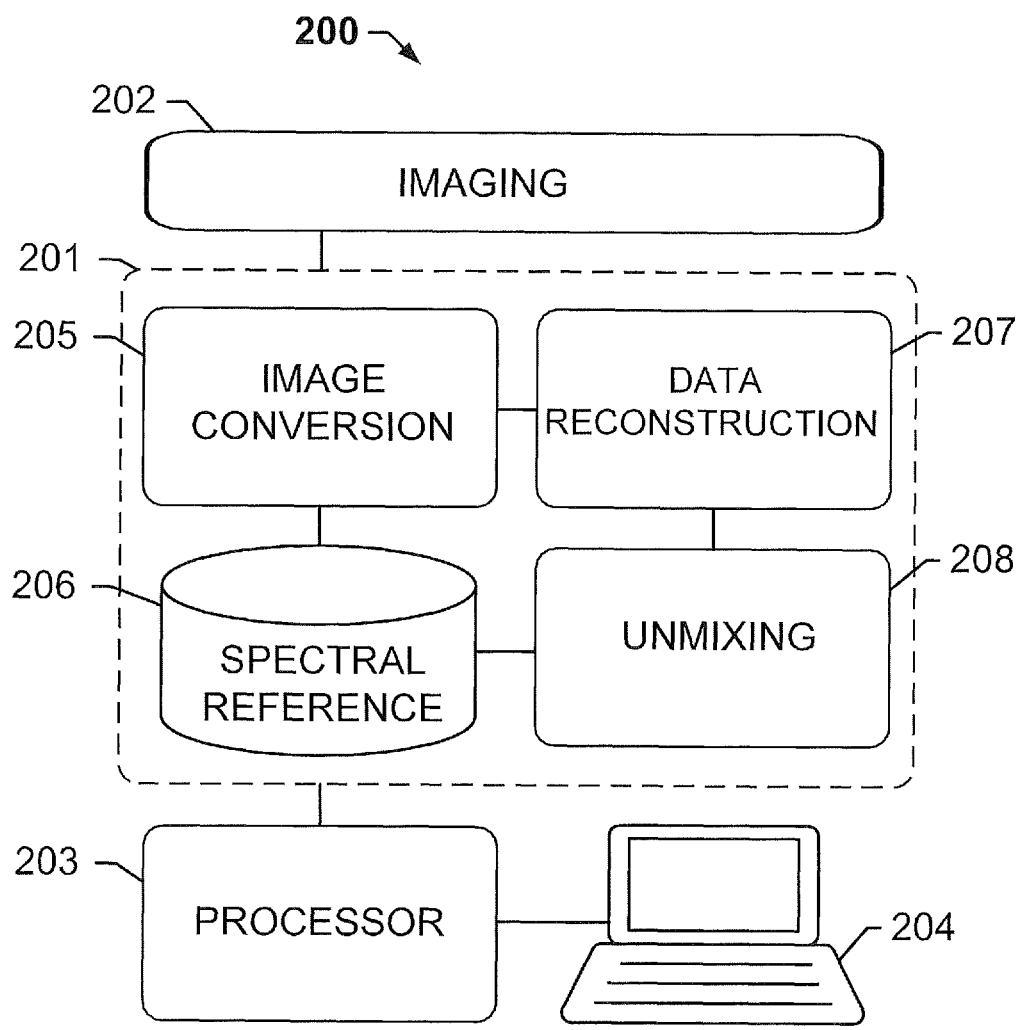
FIG. 2 sets forth various modules that can be utilized in a digital pathology system or within a digital pathology workflow.

FIG. 2 provides an overview of the various modules utilized within the presently disclosed digital pathology system. In some embodiments, the digital pathology system employs a computer device 204 or computer-implemented method having one or more processors 203 and at least one memory 201, the at least one memory 201 storing non-transitory computer-readable instructions for execution by the one or more processors to cause the one or more processors to execute instructions in one or more modules (e.g. modules 202, and 205 through 208). Alternatively, the instructions may be stored in a non-transitory computer-readable medium (201) or computer-usable medium. In some embodiments, a non-transitory computer-readable media 201 may comprise all computer-readable media except for a transitory, propagating signal.

Figure 3:
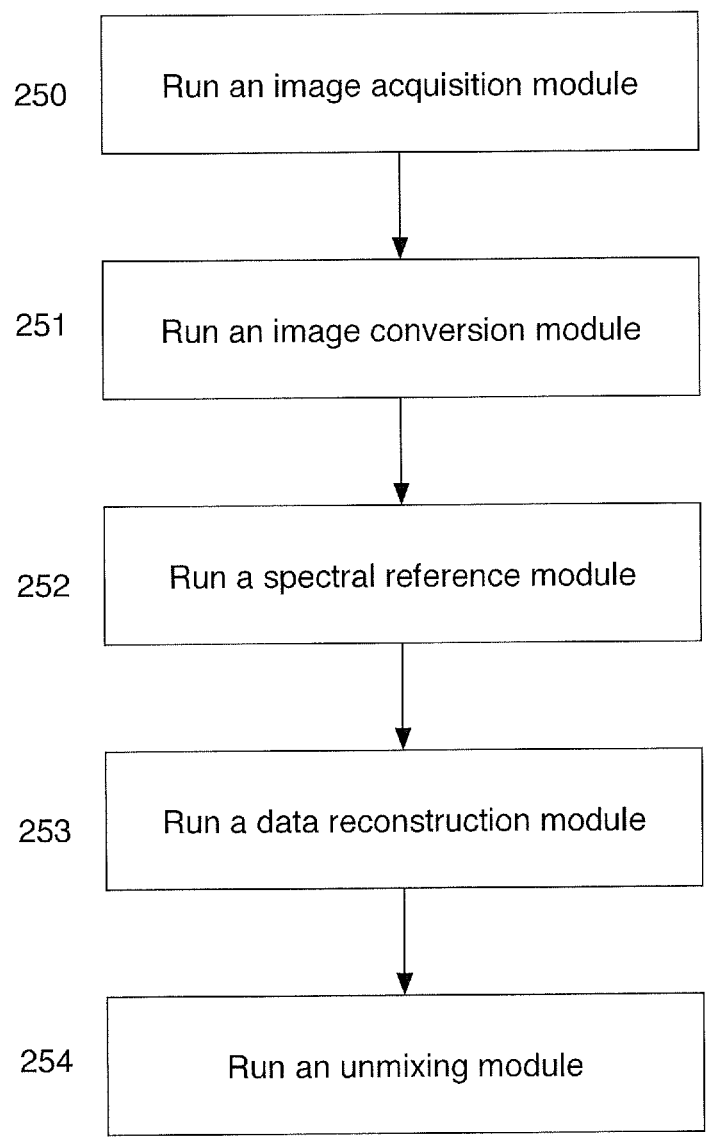
FIG. 3 provides an overview of the steps for unmixing an image.

With reference to FIGS. 2 and 3, the present disclosure provides a computer-implemented method of unmixing spectra data comprising the steps of (a) running an image acquisition module 202 to generate or receive a multi-channel image data, e.g. an acquired image, or a biological sample stained with at least two stains (step 250); (b) running an image conversion module 205 to convert image intensity data into optical density values for each channel in RGB color space (step 251); (c) running a spectra reference module 206 to derive or retrieve stored color reference vectors (reference spectra) for each stain in the biological sample (and, in the case of concentration-dependent stains, retrieve or derive a plurality of color reference vectors characterizing the stain at a plurality of varying concentrations) (step 252); (d) running a data reconstruction module 207 to determine the stain-specific color reference vectors that provide an optimal color space (e.g. one that approaches linearity and/or best takes into consideration concentration-dependent effects of the stain on detected light) (step 253); and (e) running an unmixing module 208 to extract stain-specific contributions to each RGB channels in detected light using the determined stain-specific color reference vectors (step 254). Of course, the skilled artisan will recognize that any of the instructions, algorithms, and filters described for use within each module may be adapted or changed based on the types of images acquired and/or the type of specimens being studied. The skilled artisan will also appreciate that additional modules may be incorporated into the workflow. For example, an image processing module may be run to apply certain filters to the acquired images or to identify certain histological and/or morphological structures within the tissue samples. Likewise, a region of interest selection module may be utilized to select a particular portion, such as a pre-determined portion or one containing a co-localization of two stains for analysis, of an image for analysis. By way of further example, after unmixing, a module may be run to determine a concentration of one or more stains within the sample.

Figure 4:
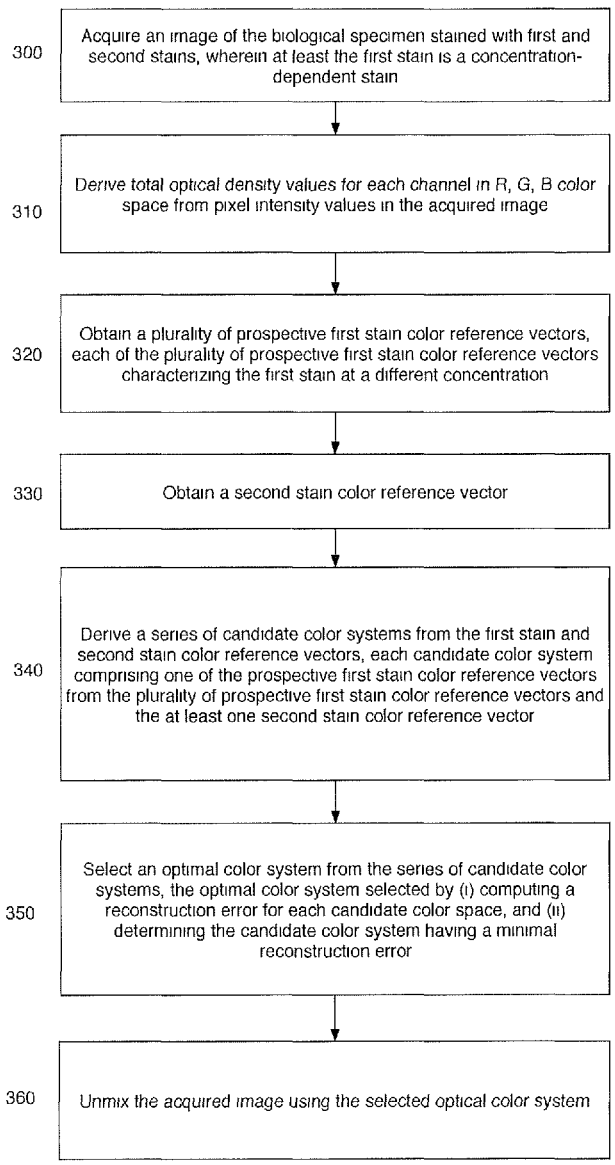
FIG. 4 provides an overview of the steps for unmixing an image.

With reference to FIG. 4, the present disclosure provides as method of unmixing an image of a biological specimen stained with at least two stains comprising: (a) deriving total optical density values for each channel in R, G, B color space from pixel intensity values in an image or a portion of an image having a first stain and a second stain, wherein at least the first stain is a concentration-dependent stain (step 310); (b) obtaining a plurality of prospective first stain color reference vectors, each of the plurality of prospective first stain color reference vectors characterizing the first stain at a different concentration (step 320); (c) obtaining at least one second stain color reference vector (step 330); (d) deriving a series of candidate color systems from the first stain and second stain color reference vectors, each candidate color system comprising one of the prospective first stain color reference vectors from the plurality of prospective first stain color reference vectors and the at least one second stain color reference vector (step 340); (e) selecting an optimal color system from the series of candidate color systems (step 350), the optimal color system selected by (i) computing a reconstruction error for each candidate color space, and (ii) determining the candidate color space having a minimal reconstruction error; and (f) unmixing the acquired image using the selected optimal color system (step 360).

Image Acquisition Module

As an initial step, and with reference to FIGS. 3 and 4, the digital pathology system runs an image acquisition module 202 to capture images or image data (steps 250 and 300) of a biological sample having one or more stains. In some embodiments, the images received or acquired are RGB images or multispectral images. In some embodiments, the images captured are stored in memory 201.

The images or image data (used interchangeably herein) may be acquiring using the imaging apparatus 12, such as in real-time. In some embodiments, the images are acquired from a microscope or other instrument capable of capturing image data of a specimen-bearing microscope slide, as noted herein. In some embodiments, the images are acquired using a 2D scanner, such as one capable of scanning image tiles. Alternatively, the images may be images that have been previously acquired (e.g. scanned) and stored in a memory 201 (or, for that matter, retrieved from a server via network 20).

The sample may be stained through application of a stain containing one or more different markers or chromogenic stains. Chromogenic stains may comprise Hematoxylin, Eosin, Fast Red, or 3,3'-Diaminobenzidine (DAB). Of course, the skilled artisan will appreciate that nay biological sample may also be stained with one or more fluorophores. A typical biological sample is processed in an automated staining/assay platform that applies a stain to the sample. There are a variety of commercial products on the market suitable for use as the staining/assay platform, one example being the Discovery™ product of Ventana Medical Systems, Inc. (Tucson, Ariz.). The camera platform may also include a bright field microscope, one example being the VENTANA iScan HT product of Ventana Medical Systems, Inc., or any microscope having one or more objective lenses and a digital imager, as well as a set of spectral filters. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

Figure 5:
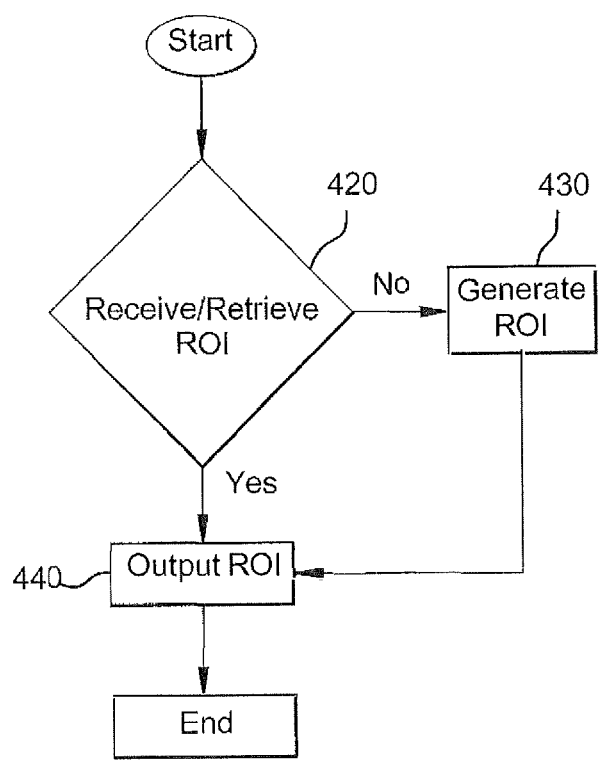
FIG. 5 sets forth a flow chart illustrating the steps of selecting a region of interest within an input image.

In some embodiments, a region of interest identification module may be used to select a portion of the biological sample for which an image or for which image data should be acquired. FIG. 5 provides a flow chart illustrating the steps of region selection. In step 420, the region selection module receives an identified region of interest or field of view. In some embodiments, the region of interest is identified by a user of a system of the present disclosure, or another system communicatively coupled to a system of the present disclosure. Alternatively, and in other embodiments, the region selection module retrieves a location or identification of a region or interest from a storage/memory. In some embodiments, as shown in step 430, the region selection module automatically generates a FOV or ROI, for example, via methods described in PCT/EP2015/062015, the disclosure of which is hereby incorporated by reference herein in its entirety. In some embodiments, the region of interest is automatically determined by the system based on some predetermined criteria or characteristics that are in or of the image (e.g. for a biological sample stained with more than two stains, identifying an area of the image that comprises just two stains). In step 440, the region selection module outputs the ROI.

In some embodiments, once acquired, the plurality of images, or regions of interest therein, are provided to the image conversion module 205 such that intensity data within the acquired images may be converted to optical density data (step 310).

Image Conversion Module

Upon receiving image data, an image conversion module 205 may be executed for converting image intensity data or pixel intensity data into an optical density (OD) data (steps 251 and 310). In this regard, and given an acquired image of a biological sample, a total optical density (in the totality of detected light) may be derived for each channel in RGB color space. More specifically, and using the relationships identified below, a total optical density for the blue channel, the red channel, and green channel in RGB color space may be derived and provided to data reconstruction module 207.

The conversion into optical density space utilizes the Beer-Lambert law, which is based on the principle that the optical density is proportional to a stain's concentration, as described in further detail below. According to the Beer-Lambert Law of Absorbance the transmitted intensity of monochromatic light passing through an absorbing medium is given by $$I = I_0 e^{-\alpha s}$$

where $I_0$ is the incident light intensity, $\alpha$ is known as the absorption coefficient of the absorbing medium, and s is the product of the concentration of the absorbing medium and path length. The Beer-Lambert Law holds for every wavelength of incident light, with a different value of $\alpha$ for every wavelength. Thus, for an imaging device with N bands, the Beer-Lambert Law may be written as $$(I_1, I_2, I_3, I_{03}e^{-\alpha_3 s}, \ldots, I_{0N}e^{-\alpha_N s}, I_N) = (I_{01}e^{-\alpha_1 s}, I_{02}e^{-\alpha_2 s},$$

where $I_{0j}$ is the incident light intensity in band j, and $\alpha j$ is the absorption coefficient in band j. If there are multiple absorbing media (multiple stains in the case of histologically prepared tissue specimens), the absorbance effects are multiplicative. So, for example, in the case of two stains, the transmitted intensity is:

$$(I_1,I_2,I_3, \ldots ,I_N) = (I_{01}e^{-\alpha_1 s} \cdot e^{-\beta_2 t}, I_{02}e^{-\alpha_2 s} \cdot e^{-\beta_2 t},$$
$$I_{03}e^{-\alpha_3 s} \cdot e^{-\beta_3 t}, \ldots ,I_{0N}e^{-\alpha_N s} \cdot e^{-\beta_N t}) =$$
$$I_{01}e^{-(\alpha_1 s + \beta_1 t)}, I_{02}e^{-(\alpha_2 s + \beta_2 t)},$$
$$I_{03}e^{-(\alpha_1 s + \beta_1 t)}, \ldots ,I_{0N}e^{-(\alpha_N s + \beta_N t)})$$

where the β values are the absorption coefficients for the second stain, and t is product of the concentration and path length for the second stain.

If $D_j$ denotes the optical density in band j, the optical density is given by $$(D_1,D_2,D_3, \ldots ,D_N) = -(\ln[I_1/I_{01}], \ln[I_2/I_{02}], \ln[I_3/I_{03}], \ldots ,\ln[I_N/I_{0N}])$$

Thus, for the example of the case of two stains, the optical density is $$(D_1,D_2,D_3, \ldots ,D_N) = ([\alpha_1 s + \beta_1 t], [\alpha_2 s + \beta_2 t], [\alpha_3 s + \beta_3 t], \ldots ,[\alpha_N s + \beta_N t]) = s(\alpha 1, \alpha_2, \alpha_3, \ldots , \alpha N) + t(\beta_1, \beta_2, \beta_3, \ldots ,\beta_3 N)$$

The conversion of image intensity data into the optical density domain is further described in United States Patent Publication No 2002/0196964, the disclosure of which is hereby incorporated by reference herein in its entirety.

The total optical density information derived from the image conversion module 205 for each channel in RGB color space is then stored in a memory 201 and used by the data reconstruction module 207 in determining the optimal color system for unmixing the acquired image (step 350).

Spectral Reference Module

The digital pathology system 200 may comprise a spectral reference module 206 which stores color data, e.g. color data indicative of a color of the stains. The color data may be descriptive of a single frequency or a characteristic spectral profile of the stain. The spectral reference module 206 may store color data for each of a plurality of stains. The plurality of stains may comprise at least 4, at least 10, at least 20 or at least 100 stains. In some embodiments, the spectral reference module 206 selects color reference vectors for only the stains present in a portion of an image (e.g. where these exist two colocalized stains), a region of interest, or a field of view. Alternatively, the spectral reference module 206 may derive color data for a particular stain as described herein.

In some embodiments, the stored color data are color reference vectors specific to a particular stain. The color reference vectors correspond to the color or spectral data that defines a stain (e.g., for example according to its color or spectrum component contributions), such that a stain can be identified as present in an image according to whether a color (e.g., indicative of a stain) that appears in an image matches or deviates, within a pre-determined range, from the reference color vector or stain color vector values. For example, for RGB images, the color reference vectors correspond to RGB values that define what is sometimes referred to as the true stain or the pure stain. The skilled artisan will appreciate that the stain-specific optical density value for each channel can be determined by measuring RGB color channel value ($I_R$, $I_G$, $I_B$) in slides stained with a single stain. By way of example, a color reference vector for a hematoxylin stain may be [0.18 0.20 0.08].

In some embodiments, the spectral reference module 206 is stores a plurality of color reference vectors for a single stain, where each individual color reference vector within the plurality of color reference vectors for the stain characterizes the stain at a different concentration. For example, for the stain DAB, the spectra reference module 206 may comprise a set of DAB color reference vectors, each of the DAB color reference vectors within the set characterizing the RGB contributions of DAB at a different concentration. For example, a first color reference vector for DAB at a first concentration (e.g. 1x) may be [x y x] (where each of x, y, and z represent optical density values of a stain in the RGB color space); while a second color reference vector for DAB at a second concentration (e.g. 2x) may be [x' y' z']; and a third color reference vector for DAB at a third concentration (e.g. 4x) may be [x" y" z" ]. In some embodiments, between 1 and 100 color reference vectors are stored for a single stain. In other embodiments, between 1 and 50 color reference vectors are stored for a single stain. In yet other embodiments, between 1 and 25 color reference vectors are stored for a single stain.

In some embodiments, the spectra reference module may be used to derive a series of color reference vectors for a particular stain, based on image data derived from color calibration slides coated with varying concentrations of a stain. Methods of preparing such "color calibration slides" are described in Example 2 herein.

Assuming that an N number of reference standard slides for a single stain have been prepared, and assuming that each slide presents a different concentration of the same stain, a series of color reference vectors can be calculated by computing the average normalized $OD_R$, $OD_G$, $OD_B$ for pixels in each slide.

The optical density (OD) for red, green and blue spectral bands are defined by ($OD_R$, $OD_G$, $OD_B$), which are the negative logarithms of the ratio of the RGB color channel value ($I_R$, $I_G$, $I_B$) and the maximum channel values ($I_{0R}$, $I_{0G}$, $I_{0B}$). For an 8-bit camera, this definition is expressed as:

$$OD_R = A \cdot c_R = -\ln\left(\frac{I_R}{I_{0R}}\right) = -\ln\left(\frac{I_R}{255}\right)$$

$$OD_G = A \cdot c_G = -\ln\left(\frac{I_G}{I_{0G}}\right) = -\ln\left(\frac{I_G}{255}\right)$$

$$OD_B = A \cdot c_B = -\ln\left(\frac{I_B}{I_{0B}}\right) = -\ln\left(\frac{I_B}{255}\right)$$

As can be seen, the optical density for each channel is linear with the amount of stain. Moreover, each pure stain can be characterized jointly by the optical density for the light in the three (RGB) channels, which is represented by a vector ($OD_R$, $OD_G$, $OD_B$) in the optical density converted RBG color space.

In some embodiments, the average normalized $OD_R$, $OD_G$, $OD_B$ for pixels in each slide are computed in only selected regions to reduce the impact of artifacts. If $V_1$, $V_2 \ldots , V_N$ represent the reference color vector from slide 1, 2 ... , N, respectively, then:

$$V_i = [\widehat{OD}_{R_i}, \widehat{OD}_{G_i}, \widehat{OD}_{B_i}], i=1,2, \ldots ,N \qquad (1)$$

where "$\widehat{OD}$" denotes normalized OD values.

Alternative methods of preparing color reference vectors are described in Application No. PCT7EP2014/055028, the disclosure of which is hereby incorporated by reference herein in its entirety.

The color reference vectors derived from color calibration slides may be stored in a memory 201, which may be output to data reconstruction 207 module.

Data Reconstruction Module

After the spectral reference module 206 is run such that color reference vectors are either obtained or derived (steps 252, 320, and 330), the relevant color reference vectors, or sets of color reference vectors for concentration-dependent stains, are provided to the data reconstruction module 207. In general, the data reconstruction module 207 utilizes the entirety of the color reference vectors supplied as input and, together with the total optical density data for each of the channels in RGB color space received from the image conversion module 205, determines an optimal color system for use in unmixing the acquired image data (step 350). The data reconstruction module takes into consideration the concentration-dependent nature of the stains and thus allows for increased resolution of concentration-dependent stain intensity after unmixing.

By "optimal color system" it is meant that a color system is selected in RGB color space that best approximates the proportions of the R, G, B channel signal in the detected light from each stain by taking into consideration the effects of the concentration of the stain in the sample (i.e. how concentration and/or precipitate formation effect light extinction due to absorptivity and/or light scattering). The skilled artisan will appreciate that the optimal color system will include a color reference vector for the concentration-dependent stain that best achieves linearity for the particular concentration of stain in the sample. It is believed that the selection of the optimal color system enables improved unmixing results as compared with methods that do not take the concentration of the stains into consideration, as evidenced in Examples 6 and 7 (see also FIG. 11).

In the methods which follow, error values, namely reconstruction error values, are utilized to characterize candidate color systems, and to predict the optimal color system from a series of candidate color systems. It is a goal of the methods to calculate a reconstruction error for each of the candidate color systems, and then determine the candidate color system which yields the lowest reconstruction error. Thus, if M candidate color systems exist, the reconstruction error is computed for each candidate color system (i.e. for each unique pairing of color reference vectors characterizing the first and second stains), and the candidate system which yields the minimal reconstruction error is selected. The skilled artisan will appreciate that by using this method, there is no limitation in the number of candidate color systems. Thus, the systems and methods described herein are suitable for use in selecting a color system when there are two concentration-dependent stains, and/or a significant number of color reference vectors describing a multitude of concentrations for a single stain. It is believed that by choosing a color system whose reconstruction error is minimalized, or approaches zero, it ensures that all channels in RGB color space are as close to linear as possible.

Figure 6A:
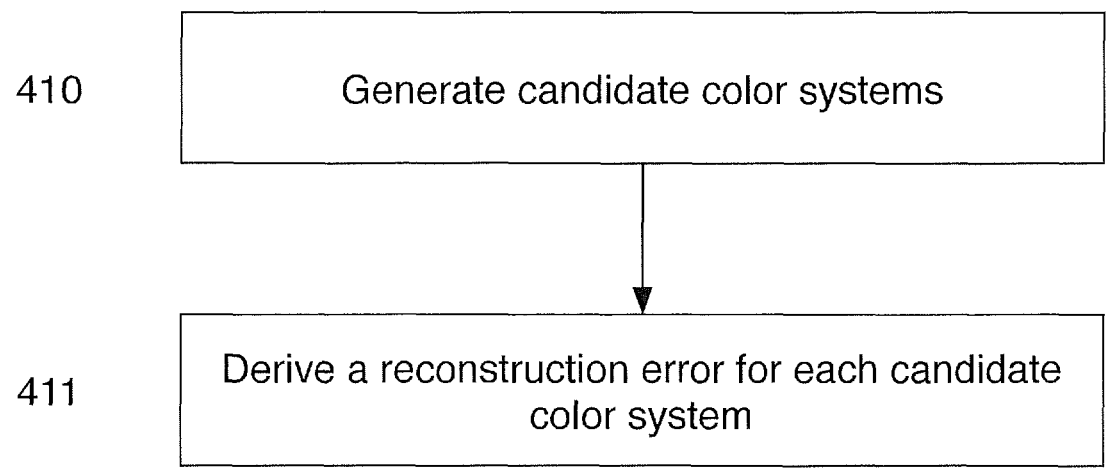
FIG. 6A provides a flow chart illustrating the steps of selecting an optimal color system for unmixing.

With reference to FIG. 6A, a first step in determining an optimal color system is to generate a series of candidate color systems (step 410). Each candidate color system within the series of candidate color systems comprising a color reference vector characterizing a first stain and a color reference vector characterizing a second stain. Essentially, each candidate color system is a matrix of two color reference vectors (and thus a matrix of optical density values), where color reference vector characterizes a different stain, and where each candidate color system is different.

Assuming that the first stain is a concentration-dependent stain and the spectral reference module 206 provides a set of prospective color reference vectors (e.g. 10 discrete color reference vectors), with each individual prospective color reference characterizing the concentration-dependent stain over a plurality of different concentrations (e.g. 1×, 2×, 4× . . . Nx stain concentrations), each candidate color system would comprise one of the prospective color reference spectra for the concentration-dependent stain. In this hypothetical, if the second stain is a concentration-independent stain, each candidate color system would comprise one of the prospective color reference spectra for the concentration-dependent stain and the color reference spectra of the concentration-independent stain.

On the other hand, if the second stain were also a concentration-dependent stain (i.e. the system comprises first and second concentration-dependent stains), then each candidate color system would comprise (i) one of the prospective color reference spectra for the first concentration-dependent stain; and (ii) one of the prospective color reference spectra for the second concentration-dependent stain. The skilled artisan will appreciate that in this instance, all permutations of combinations of prospective color reference vectors for both the first and second concentration-dependent stains would need to be considered (i.e. a reconstruction error derived for each permutation or pairing).

Once each of the candidate color systems is constructed (step 410), a reconstruction error is determined for each (step 411). In general, reconstruction error refers to the difference between the measured true data value and the mathematically derived data value following certain reconstruction theories.

For a biological sample stained with a concentration-dependent stain ("x") (e.g. DAB) and a concentration-independent stain ("y") (e.g. hematoxylin), the following linear relationship applies:

$$[A_y \quad A_x] \begin{bmatrix} \widehat{OD}_{R_x} & \widehat{OD}_{G_x} & \widehat{OD}_{B_x} \\ \widehat{OD}_{R_y} & \widehat{OD}_{G_y} & \widehat{OD}_{B_y} \end{bmatrix} = \quad (1)$$

$$[OD_{R\_tissue} \quad OD_{G\_tissue} \quad OD_{B\_tissue}]$$

As used in equation (1), $A_y$ and $A_y$ represent the amount of stain for a first and a second stain, e.g. for hematoxylin and DAB. In some embodiments, $[A_y \; A_x]$ is referred to as a vector of the amounts of stain.

The vector $[OD_{R\_tissue} \; OD_{G\_tissue} \; OD_{B\_tissue}]$ describes derived total optical densities for each channel within the RGB color space, i.e., values derived using the image conversion module 205.

The matrix $$\begin{bmatrix} \widehat{OD}_{R_x} & \widehat{OD}_{G_x} & \widehat{OD}_{B_x} \\ \widehat{OD}_{R_y} & \widehat{OD}_{G_y} & \widehat{OD}_{B_y} \end{bmatrix}$$

represents a candidate color system, and $[\widehat{OD}_{R_x} \; \widehat{OD}_{G_x} \; \widehat{OD}_{B_x}]$ and $[\widehat{OD}_{R_y} \; \widehat{OD}_{G_y} \; \widehat{OD}_{G_y}]$ refer to prospective color reference vectors for a first (x) and second stain (y). Each of $\widehat{OD}_{R_x}$, $\widehat{OD}_{G_x}$, and $\widehat{OD}_{B_x}$ and $\widehat{OD}_{R_y}$, $\widehat{OD}_{G_y}$, and $\widehat{OD}_{G_y}$ are optical density values for first (x) and second (y) stains at each channel in RGB color space. For example, $\widehat{OD}_{R_x}$ may represent an optical density value for a first stain in a first channel (e.g. a red channel) in RGB color space.

By way of example, $$\begin{bmatrix} \widehat{OD}_{R_x} & \widehat{OD}_{G_x} & \widehat{OD}_{B_x} \\ \widehat{OD}_{R_y} & \widehat{OD}_{G_y} & \widehat{OD}_{B_y} \end{bmatrix}$$

may represents a first candidate color system, where and $[\widehat{OD}_{R_y}\ \widehat{OD}_{G_y}\ \widehat{OD}_{G_y}]$ is a first prospective color reference vector characterizing a concentration-dependent stain at a first concentration, and $[\widehat{OD}_{R_x}\ \widehat{OD}_{G_x}\ \widehat{OD}_{B_x}]$ refers to a color reference vectors for the same concentration-independent stain.

Likewise, $$\begin{bmatrix} \widehat{OD}_{R_x} & \widehat{OD}_{G_x} & \widehat{OD}_{B_x} \\ \widehat{OD}_{R_y} & \widehat{OD}_{G_y} & \widehat{OD}_{B_y} \end{bmatrix}$$

may represent a second candidate color system, where and $[\widehat{OD}_{R_y},\ \widehat{OD}_{G_y},\ \widehat{OD}_{G_y}]$ is a second prospective color reference vector characterizing a concentration-dependent stain at a second concentration, and $[\widehat{OD}_{R_x}\ \widehat{OD}_{G_x}\ \widehat{OD}_{B_x}]$ refers to a color reference vectors for the same concentration-independent stain.

Figure 6B:
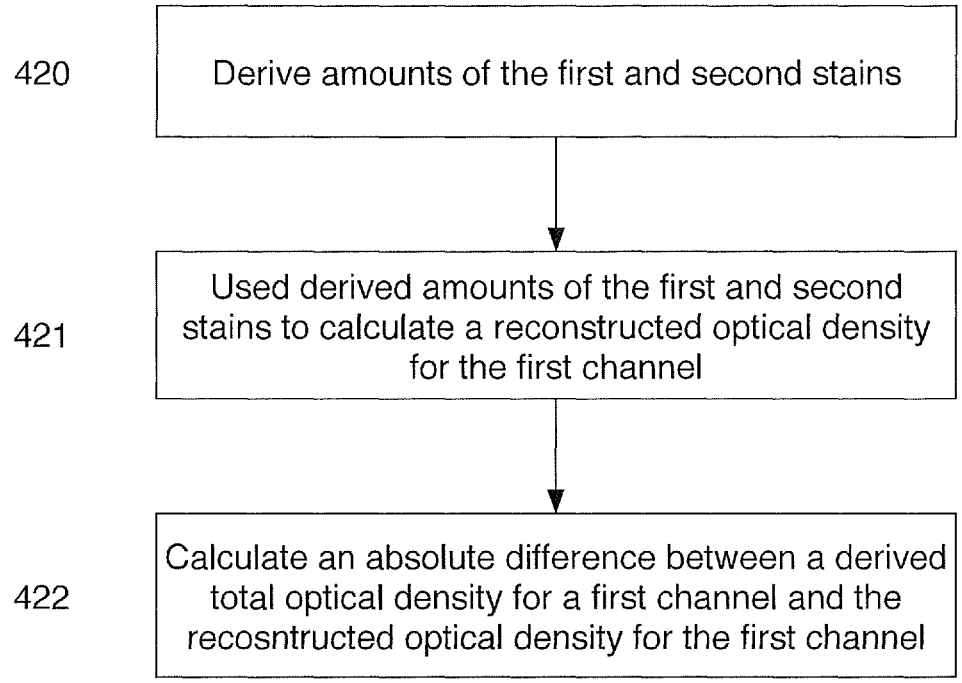
FIG. 6B provides a flow chart illustrating the steps of deriving a reconstruction error for each candidate color system.

The skilled artisan will appreciate that, for any given candidate color system, equation (1) is an over determined equation. Hence, the amounts of the first and second stains $A_1$ and $A_2$, can be determined (step 420 of FIG. 6B) using information from only two channels. For example, by using the red and green channel signals in RGB color space and solving equation (2) the values for $A_1$ and $A_2$ may be derived.

$$[A_y\ A_x]\begin{bmatrix} \widehat{OD}_{R_x} & \widehat{OD}_{G_x} \\ \widehat{OD}_{R_y} & \widehat{OD}_{G_y} \end{bmatrix} = [OD_{R\_tissue}\ OD_{G\_tissue}] \quad (2)$$

As used in equation (2), the matrix $$\begin{bmatrix} \widehat{OD}_{R_x} & \widehat{OD}_{G_x} \\ \widehat{OD}_{R_y} & \widehat{OD}_{G_y} \end{bmatrix}$$

is referred to herein as a reconstruction matrix and comprises optical density values for two of the channels in RGB color space for each stain. For example, the reconstruction matrix may comprise signals for the green and blue channels, the green and red channels, and the red and blue channels. A separate candidate reconstruction matrix is derived for each candidate color system.

In some embodiments, solving equation (2) for $A_y$, $A_x$ comprises multiplying a vector of the derived total optical densities for two of the channels (red and green channels in the example above) by an inverse of a candidate reconstruction matrices derived from a candidate color system, e.g.

$$\begin{bmatrix} \widehat{OD}_{R_x} & \widehat{OD}_{G_x} \\ \widehat{OD}_{R_y} & \widehat{OD}_{G_y} \end{bmatrix}^{(-1)}.$$

Following derivation of the amounts of the first and second stains, a reconstructed total optical density is computed (step 421). The reconstructed total optical density is computed using the channel in the RGB color space not represented in the reconstruction matrix, namely the third channel not solved for in equation (3). For example, the reconstructed total optical density is computed for the blue channel when red and green channel optical density values are provided in a reconstruction matrix, and the amounts of the first and second stains are derived using the red and green channels. The reconstructed total optical density may be computed for the blue channel using equation (3):

$$O\widetilde{D}_{B_{tissue}} = A_y \cdot \widehat{OD}_{B_y} + A_x \cdot \widehat{OD}_{B_x} \quad (3),$$

where $O\widetilde{D}_{B_{tissue}}$ is the reconstructed total blue channel signal (from module 205), $A_y$ and $A_x$ are the derived amounts of the first and second stains, and $\widehat{OD}_{B_y}$ and $\widehat{OD}_{B_x}$ are the optical density values for the blue channel from the candidate color system for the first and second stains, respectively (i.e. from the candidate color system generated and used to provide the candidate reconstruction matrix).

Finally, a reconstruction error is calculated (step 422) using the derived total optical density value for the blue channel (from module 205) and the reconstructed total blue channel optical density. The reconstruction error is calculated by finding the absolute difference between these two values, as set forth in equation (4):

$$\text{Error}=\text{abs}(OD_{B_{tissue}} - O\widetilde{D}_{B_{tissue}}) \quad (4)$$

The reconstruction error from step 422 may be stored in a memory 201. Steps 420, 421, and 422 are repeated for each candidate color system, i.e. a reconstruction error is computed for each candidate color system. Once the reconstruction errors are calculated for all candidate color systems, the candidate color system having the lowest reconstruction error is selected as the optimal color system, i.e. the color system best representing each of the stains taking into consideration any concentration effects. In some embodiments, the selection of the lowest reconstruction error may be accomplished by ranking each of the calculated reconstruction errors stored in a memory 201.

In some embodiments, the optimal color system approximates the true concentration-dependent stain concentration in the mixture of stains in the biological sample. The optimal color system is then output to the unmixing module 208 for use in unmixing the acquired image.

While the example above calculates the reconstruction error on the blue channel, the skilled artisan will appreciate that the reconstruction error may be computed on the green or red channels according to the procedures noted above.

Alternative Methods of Calculating Error (1) Normalized Cross Product

An alternative method of determining reconstruction error utilizes a normalized cross product as noted below. The cross product or vector product is a binary operation on two vectors in three-dimensional space. Given two linearly independent vectors a and b, the cross product, a×b, is a vector that is perpendicular to both a and b, and thus normal to the plane containing them. If two vectors have the same direction (or have the exact opposite direction from one another, i.e. are not linearly independent) or if either one has zero length, then their cross product is zero.

With reference to equation (5), where the vector [m n o] is the normalized cross product of a first stain color reference vector [x y z] and a second stain color reference vector [a b c], the normalized cross product represents the vector which is perpendicular to the plane determined by the first and second stain color reference color vectors.

$$[A_1 \quad A_2 \quad A_{cross}] \begin{bmatrix} x & y & z \\ a & b & c \\ m & n & o \end{bmatrix} = [OD_{R\_tissue} \quad OD_{G\_tissue} \quad OD_{B\_tissue}], \quad (5)$$

where x, y, and z, and a, b, and c are optical density values for the R, G, and B channels, respectively.

If the optical density vector of a tissue sample pixel (in the acquired image) can be perfectly reconstructed by the linear combination of the first and second stain color reference vectors, then A_cross will be zero after solving equation (5). Therefore, the magnitude of A_cross, which is uniquely determined by the first and second stain color reference vector pair for a given tissue sample optical density vector, is an indication of how well the first and second stain color reference vectors can reconstruct the given tissue sample optical density vector. Thus, the magnitude of A_cross can be used as deconvolution error to select an optimal color system or best reference vector for a concentration-dependent stain.

Non-Normalized Reference Color Vectors

Without wishing to be bound by any particular theory, it is believed that in the RGB optical density color space, the direction of the optical density vectors for extremely weak stain and extremely strong stain can be very close to the direction corresponding to the gray hue. Specifically, extremely weak stain is close to white color; while extremely strong stain is close to black color. When such stains are present in the slide, purely relying on hue information (or optical density vector direction) may not be robust enough in finding the correct color reference vector that corresponds to the right intensity. Therefore, instead of using normalized reference color vector, a non-normalized reference vector may be used to take intensity information into consideration as well. Let and (HEM)$^{\rightarrow}$ denote the non-normalized reference vector for a first stain (DAB) and a second stain (hematoxylin); let |DAB| and |HEM| denote the length of each vector. Similar to the above method using the normalized reference vector, the over determined equations (7) or (8) are solved to derive the amounts of the first and second stains (and) which yield the minimal deconvolution error.

$$[A_{Hem} \quad A_{DAB}] \begin{bmatrix} \overrightarrow{DAB} \\ \overrightarrow{HEM} \end{bmatrix} = [OD_{R\_tissue} \quad OD_{G\_tissue} \quad OD_{B\_tissue}] \quad (7)$$

$$[A_{Hem} \quad A_{DAB} \quad A_{cross}] \begin{bmatrix} \overrightarrow{DAB} \\ \overrightarrow{HEM} \\ \overrightarrow{DAB} \times \overrightarrow{HEM} \end{bmatrix} = \quad (8)$$

$$[OD_{R\_tissue} \quad OD_{G\_tissue} \quad OD_{B\_tissue}]$$

Then, the final stain intensity for the first and second stains (DAB and HEM) is determined by solving equations (9) and (10):

$$A_{Hem} = A_{Hem} \cdot |HEM| \quad (9)$$

$$A_{DAB} = A_{DAB} \cdot |DAB| \quad (10)$$

Reference Color Vector Interpolation

If 'n' non-normalized DAB reference vector exist, i.e., $\overrightarrow{DAB}_1, \overrightarrow{DAB}_2, \ldots, \overrightarrow{DAB}_n$, using the methods identified herein, $\overrightarrow{DAB}_m$ and $\overrightarrow{DAB}_{m+1}$ are determined to be the reference vectors that yield the minimal and the second minimal error, respectively. Then we solve the linear equation $$[A_{Hem} \quad A_{DAB_m} \quad A_{DAB_{m+1}}] \begin{bmatrix} \overrightarrow{HEM} \\ \overrightarrow{DAB_m} \\ \overrightarrow{DAB_{m+1}} \end{bmatrix} = \quad (9)$$

$$[OD_{R\_tissue} \quad OD_{G\_tissue} \quad OD_{B\_tissue}]$$

for $A_{Hem}$, $A_{DAB_m}$ and $A_{DAB_{m+1}}$; and we can find the interpolated reference vector by $$\overrightarrow{DAB} = A_{DAB_m} \cdot \overrightarrow{DAB}_m + A_{DAB_{m+1}} \cdot \overrightarrow{DAB}_{m+1},$$

In some embodiments, the calculated $\overrightarrow{DAB}$ is used to perform deconvolution. This is equivalent to finding the optical density vector that is along the intersection of the plane determined by $\overrightarrow{DAB}_m$ and $\overrightarrow{DAB}_{m+1}$ and the plane determined by $\overrightarrow{HEM}$ and $[OD_{R\_tissue} \ OD_{G\_tissue} \ OD_{B\_tissue}]$. In other words, the linear combination of $\overrightarrow{HEM}$ and the calculated $\overrightarrow{DAB}$ can perfectly reconstruct the tissue signal $[OD_{R\_tissue} \ OD_{G\_tissue} \ OD_{B\_tissue}]$. At the same time, $\overrightarrow{DAB}$ is restricted to be linear combination of known reference vectors $\overrightarrow{DAB}_m$ and $\overrightarrow{DAB}_{m+1}$. It is desired that $\overrightarrow{DAB}_m$ and $\overrightarrow{DAB}_{m+1}$ are sufficiently close so that their linear combination can represent physically meaningful hues for DAB stain.

Unmixing Module

In some embodiments, the multiplex images are unmixed (step_) with unmixing module 208 using linear unmixing. Linear unmixing is described, for example, in 'Zimmermann "Spectral Imaging and Linear Unmixing in Light Microscopy" Adv Biochem Engin/Biotechnol (2005) 95:245-265' and in in 'C. L. Lawson and R. J. Hanson, "Solving least squares Problems", PrenticeHall, 1974, Chapter 23, p. 161,' the disclosures of which are incorporated herein by reference in their entirety. In linear stain unmixing, the measured spectrum (S(λ)) at any pixel is considered a linear mixture of stain spectral components and equals the sum of the proportions or weights (A) of each individual stain's color reference (R(λ)) that is being expressed at the pixel $$S(\lambda) = A_1 \cdot R_1(\lambda) + A_2 \cdot R_2(\lambda) + A_3 \cdot R_3(\lambda) \ldots A_i \cdot R_i(\lambda)$$

which can be more generally expressed as in matrix form as $$S(\lambda) = \Sigma A_i \cdot R_i(\lambda) \text{ or } S = R \cdot A$$

If there are M channels images acquired and N individual stains, the columns of the M×N matrix R is the optimal color system as derived herein, the N×1 vector A is the unknown of the proportions of individual stains and the M×1 vector S is the measured multichannel spectral vector at a pixel. In these equations, the signal in each pixel (S) is measured during acquisition of the multiplex image and the reference spectra, i.e. the optimal color system, is derived as described herein. The contributions of various stains (A$_i$) can be determined by calculating their contribution to each point in the measured spectrum. In some embodiments, the solution is obtained using an inverse least squares fitting approach that minimizes the square difference between the measured and calculated spectra by solving the following set of equations, $$[\partial \Sigma_j \{S(\lambda_j) - \Sigma_i A_i R_i(\lambda_j)\}2]/\partial A_i = 0$$

In this equation, j represents the number of detection channels and i equals the number of stains. The linear equation solution often involves allowing a constrained unmixing to force the weights (A) to sum to unity.

Other Components for Practicing Embodiments of the Present Disclosure

The computer system of the present disclosure may also be communicatively coupled to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. In some embodiments, the imaging apparatus is a brightfield imager slide scanner. One brightfield imager is the iScan Coreo brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular band-pass from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially derived propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data derived at the client device (e.g., a result of the user interaction) can be received from the client device at the server.

Example 1—Effect of Light Extinction on DAB Concentration

Figure 7:
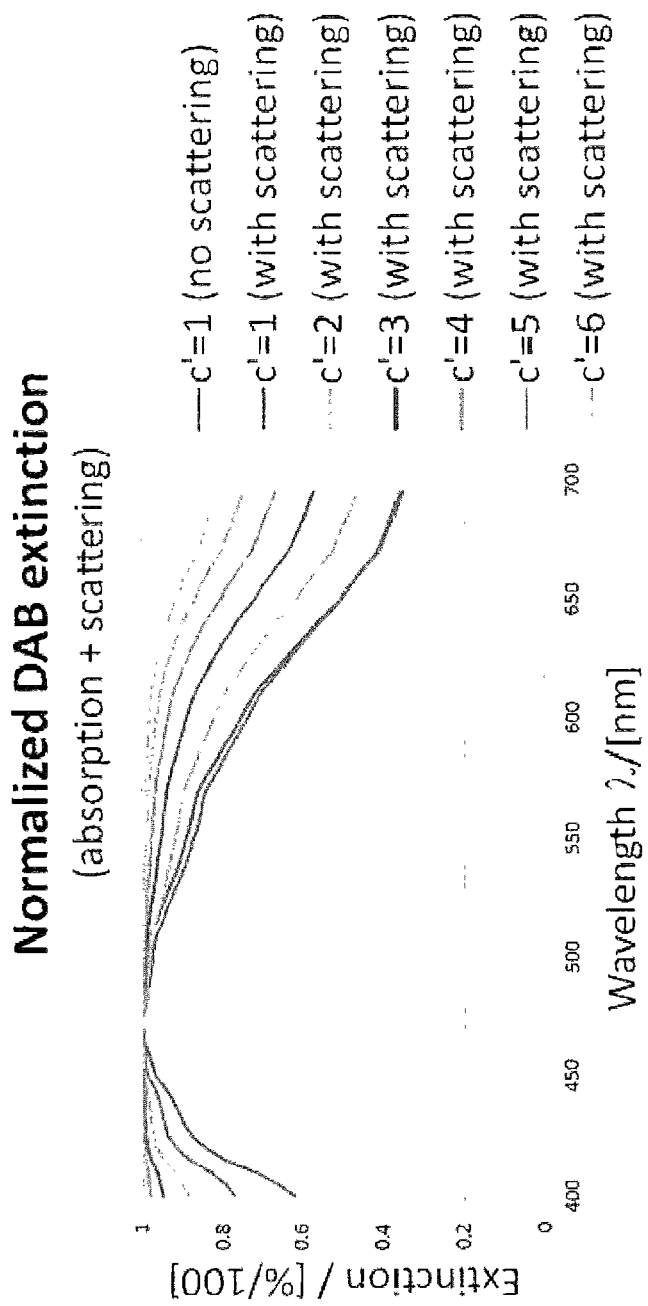
FIG. 7 illustrates the extinction of DAB for various concentrations.

The Beer-Lambert equation assumes small stain concentrations and no interaction between the absorbing molecules. In other words, it is assumed that the absorption factor $c_R$, $c_G$ and $c_B$ are the only factors to impact the light extinction, which are independent of stain concentration. However, this assumption does not hold well for DAB stain due to its precipitate-forming reaction during sample processing. Light scattering needs to be taken into consideration, which causes the light extinction (i.e., absorption+scattering) to be concentration-dependent. FIG. 7 illustrates the effect of stain concentration on extinction (see Peter H. and Tobias M., "Supplementary Information to A model based survey of color deconvolution in diagnostic bright field microscopy: Error Estimation and Spectral Consideration," Sci Rep. 2015; 5: 12096).

As shown, for a given concentration, the peak extinction (which is used as the normalization factor) accurses at about 475 nm, which roughly correspond to the center of the blue spectral band. The red spectral band, which covers the higher wavelengths, has the least extinction when compared to the peak. The extinction of green spectral band is in-between. As the stain concentration increases, the ratio to the peak extinction across different wavelengths is generally increased for wavelengths higher than about 475 nm. This means that the proportions of RGB channel signals in the detected light change due to increased scattering along with the stain concentration variations. Therefore, different OD vectors are needed to characterize DAB stain at different concentrations.

Example 2—Method of Preparing a DAB Slide with Controlled Concentrations (Reference Color Set Generation)

To study the chromatic characteristic of DAB stain at different concentration levels, DAB slides with controlled concentrations are generated. Considering that tissue sample will introduce significant intra-slide variations of DAB concentration, a special slide preparation process has been developed to generate slide with uniform DAB concentration distribution. This helps to extract reliable reference color vector for a particular concentration level.

DAB reagent: 48.5 mM diaminobenzidine, 5 mM Sodium metabisulfite, 0.5% (w/v) polyethylenimine $H_2O_2$ reagent: 118 mM $H_2O_2$, 385 mM potassium phosphate dibasic, trihydrate, 115 mM potassium phosphate monobasic, pH 7.3, 240 mM sodium chloride, 700 mM imidazole, 700 mM 2-hydroxypyridine, 0.25% (w/v) Brij-35

Gelatin, 50 bloom (MP Biomedicals)

OptiView anti-HQ HRP (Ventana Medical Systems, Inc.)

OptiView Copper (Ventana Medical Systems, Inc.)

Glutaraldehyde solution, Grade I (Sigma-Aldrich)

For gel preparation, a solution of 3% (w/v) gelatin in DI $H_2O$ was made. This solution was dissolved by heating to 70° C. with occasional stirring. Once the solution was dissolved, 300 uL of it was removed and cooled to 37° C. for 5 minutes.

While the gel solution cooled, the other reagents were warmed to 37° C. Once everything was equilibrated to 37° C. 100 uL OptiView anti-HQ HRP was mixed with the gelatin aliquot. In a separate tube, 300 uL DAB and 300 uL $H_2O_2$ were mixed, then the mixture was added to the gelatin+anti-HQ HRP mixture and the whole solution was mixed thoroughly. Finally, 100 uL OptiView Copper reagent was added to the mixture and everything was mixed again.

300 uL of this gelatin mixture was pipetted onto the non-frosted portion of a clear SuperFrost Plus slide. The slide was carefully tilted in an orbital motion to ensure the gelatin mixture fully and evenly covered the non-frosted portion of the slide. The slide was placed horizontally on a surface cooled to 4° C. and incubated for 3 minutes to set the gel. Once the gel was set, 50 uL of glutaraldehyde was applied to the surface of the hardened DAB gel and a glass 1.5 mm coverslip was immediately placed on the gel to spread the glutaraldehyde across the entire DAB gel surface. The slide was then incubated at room temperature for 3 minutes while the glutaraldehyde diffused into the gel and crosslinked the gelatin particles. After 3 minutes excess fluid from the edges of the slide was carefully wiped away. Clear acrylic sealer was applied to the edges of the coverslip and the slide in order to attach the coverslip to the slide and seal the DAB gel against moisture loss.

Figure 8:
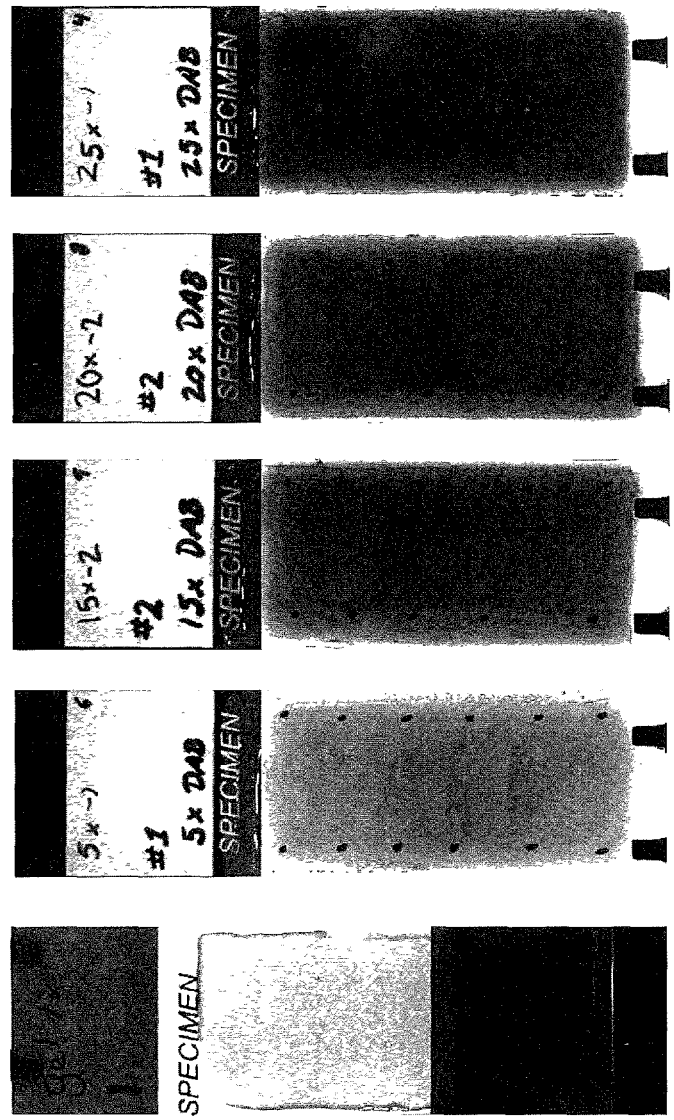
FIG. 8 illustrates five slides prepared using different concentrations of DAB, where (a) 1×, (b) 5×, (c) 15×, (d) 20×, (e) 25×, which are relative to OptiView (Ventana Medical Systems, Inc.) on-slide concentrations of approximately 1.9 mM DAB.

To visualize the chromatic characteristic of DAB at different concentration levels, the sample slides were scanned and the average optical density vector of each 1000×1000 field of view (FOV) were computed for each slide. The normalized optical density values for each RGB channel were plotted against the total optical density value for all the FOVs within a slide. Note that the total optical density value equals the length of the average optical density vector for each FOV, which indicates the stain concentration. FIG. 8 provides thumbnail images of the sample slides prepared using the disclosed method. The concentrations are (a) 1×, (b) 5×, (c) 15×, (d) 20×, (e) 25×, which are relative to OptiView on-slide concentrations of about 1.9 mM DAB.

Example 3—Impact of DAB Concentration to the Optical Density Vectors

Figure 9A:
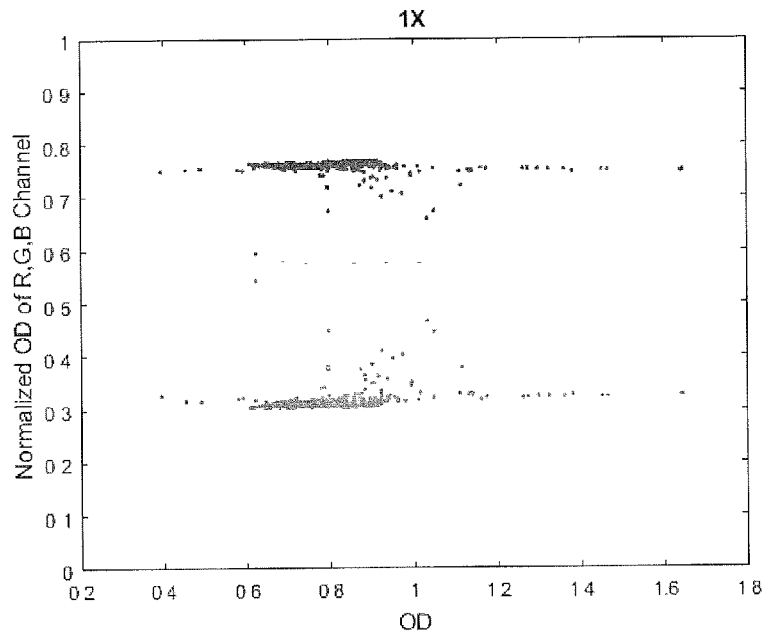
FIGS. 9A-9E illustrate the normalized OD value for each RGB channel vs. the total OD. The red, green and blue colored dots are used to represent RGB channels, respectively. Each dot corresponds to one 1000×1000 FOV in the slide. The outlier points are due to artifacts (e.g., bubbles) in the slides which can be ignored.
Figure 9B:
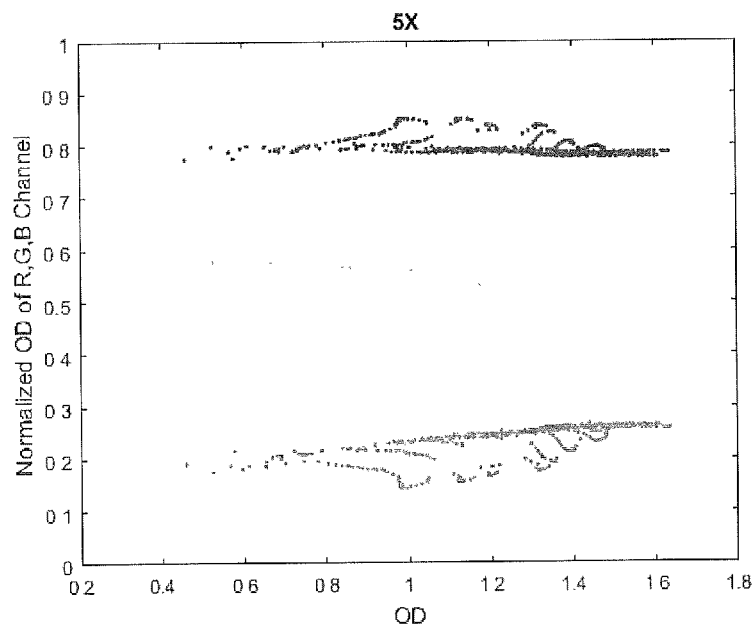
Figure 9C:
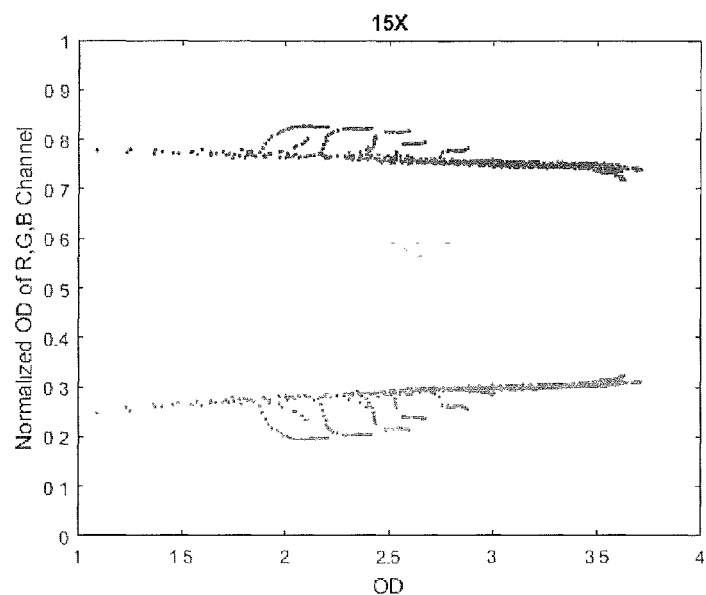
Figure 9D:
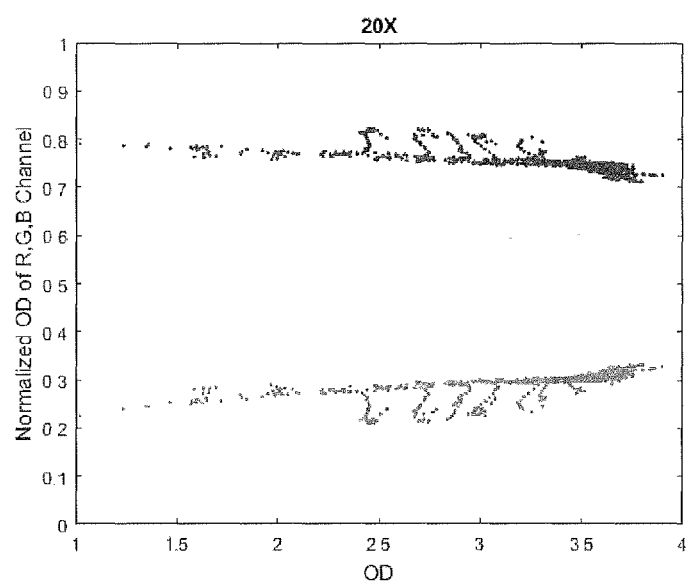
Figure 9E:
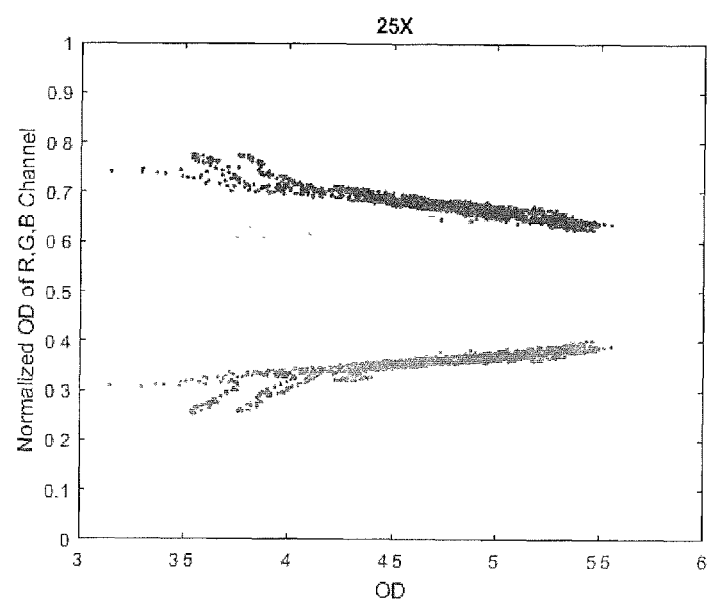
Figure 10A:
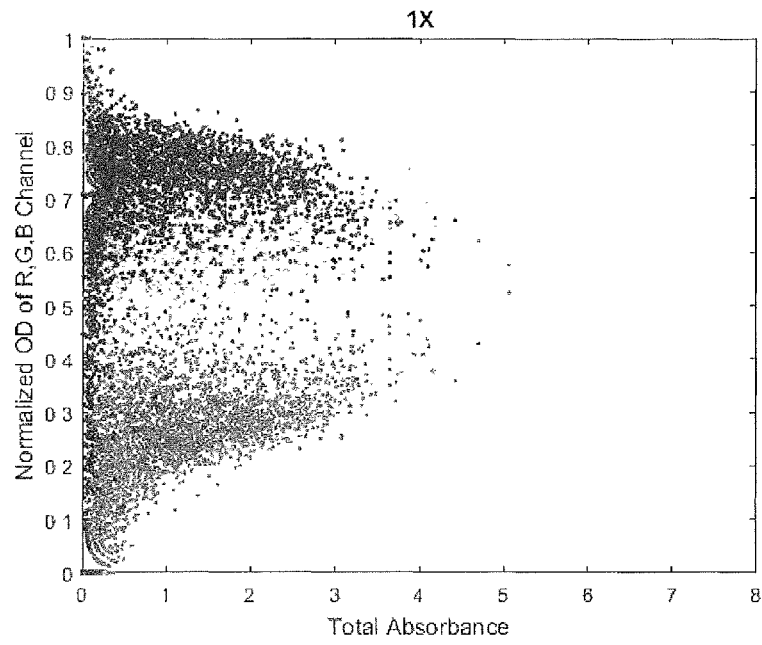
FIGS. 10A-10F illustrate normalized OD values for each RGB channel vs. the total OD value for slides processed using an anti-Vimentin IHC protocol. The red, green and blue colored dots are used to represent RGB channels, respectively. The samples are randomly selected from each of the 1000×1000 FOVs which cover the tissue.
Figure 10B:
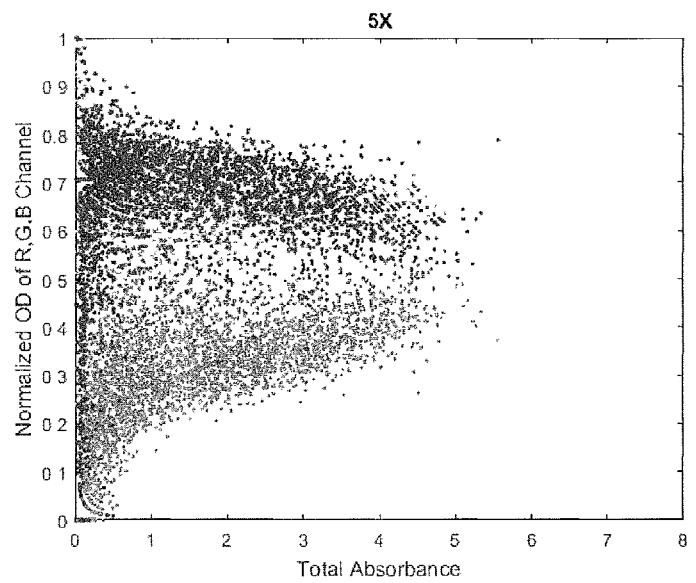
Figure 10C:
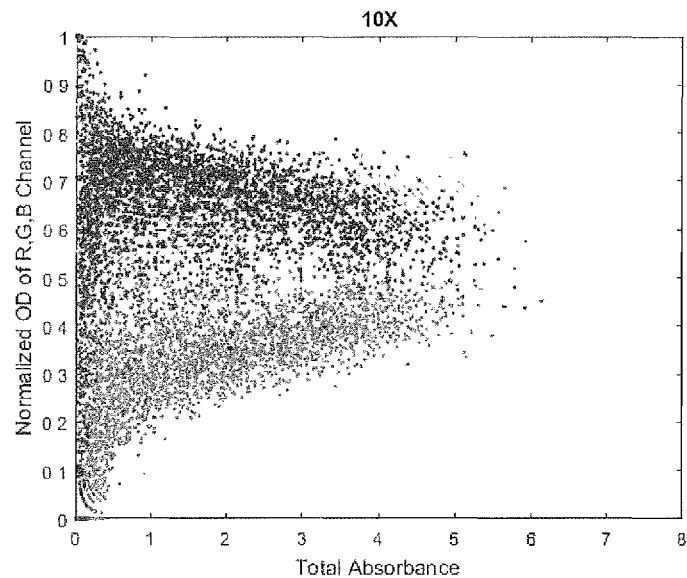
Figure 10D:
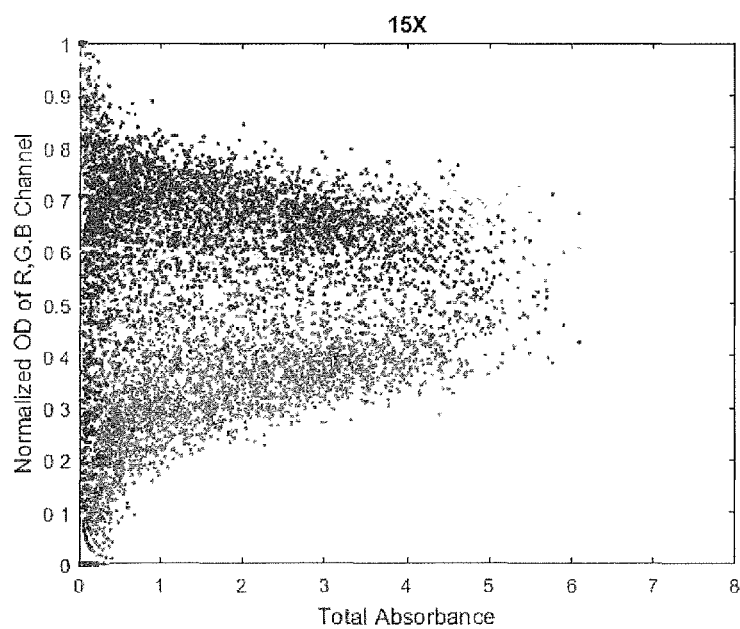
Figure 10E:
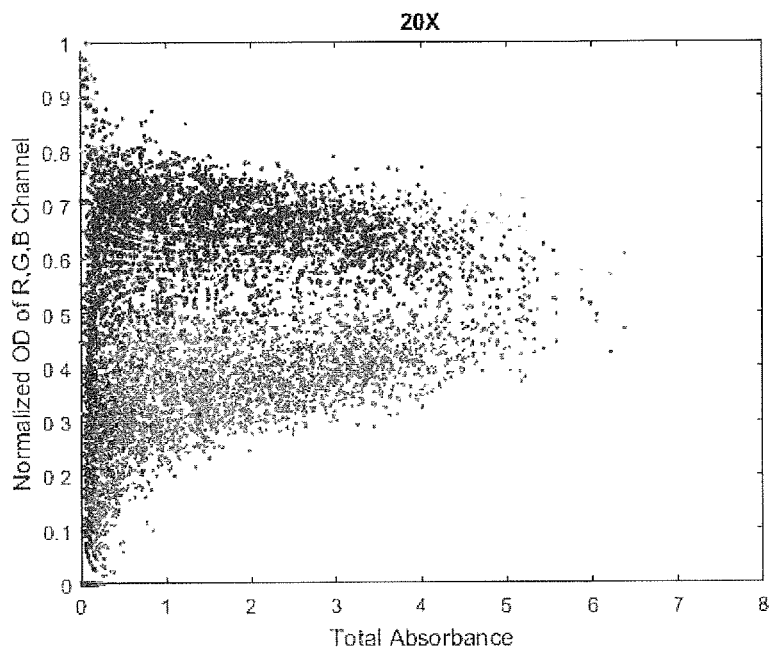
Figure 10F:
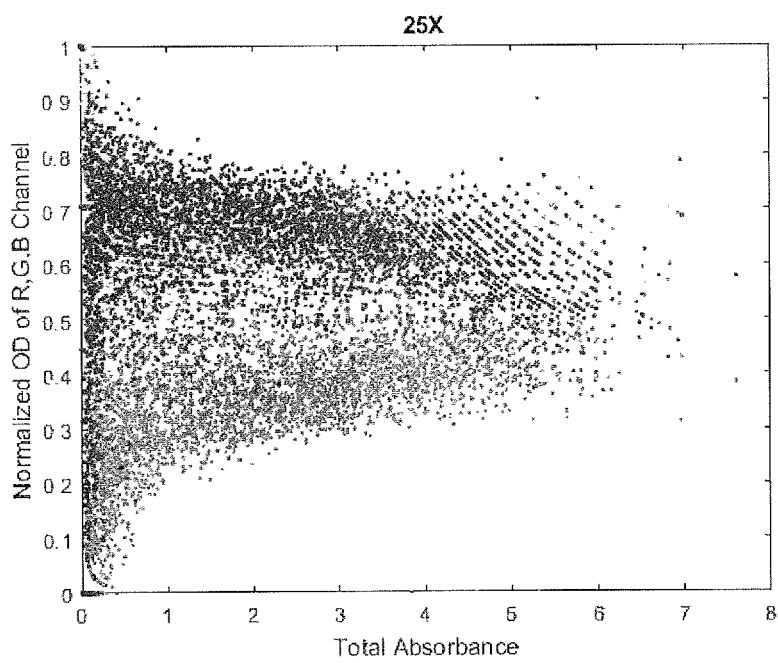

To visualize the impact of DAB concentration to the optical density vectors, the average optical density vector for a 1000×1000 FOV on each slide were computed. The normalized optical density values were plotted for each RGB channel against the total optical density value for all the FOVs within a slide. Note that the total optical density value equals the length of the average optical density vector for each FOV, which indicates the stain concentration. FIGS. 93A-9E show the results for the 5 slides as shown in FIG. 8.

As seen, $OD_R < OD_G < OD_B$ are observed for slide 1×, 5×, 15×, 20×, which is consistent with the DAB extinction plot as shown in FIG. 7. Moreover, the normalized $OD_R$, $OD_G$, $OD_B$ values generally remain constant in the low total OD value range, indicating that the Beer-Lambert's law holds reasonably well for low DAB concentrations. Decreasing of normalized $OD_B$ and increasing of normalized $OD_R$ and $OD_G$ are observed as the total OD value increases, especially when the total OD value is greater than 3. The trend is the most obvious for slide 25×, indicating strong scattering effects for high DAB concentrations. The reference color vector for each concentration level is generated by taking the average normalized OD vector for each slide (excluding the artifacts area).

Example 4—Vimentin Slides Stained by DAB with Difference Concentrations

Vimentin positive control slides are intended for use as positive controls for immunohistochemical (IHC) staining using an anti-Vimentin antibody. We performed the similar DAB analysis on Vimentin slides, where 6 slides are stain at 1×, 5×, 10×, 15×, 20× and 25× concentrations, respectively. Lung tissue (which is near the label) was used in our experiment. Considering the large stain intensity variations in the slide, instead of computing the average OD, we randomly selected 2000 pixels in each 1000×1000 FOV that covers the lung tissue in each slide, and plot the normalized $OD_R$, $OD_G$, $OD_B$ vs. the total OD value for each slide. The results are shown in FIGS. 10A-10F.

A similar changing trend of normalized OD values was observed along the increasing of the total OD value as compared with DAB gel slide, i.e. decreasing of normalized $OD_B$ and increasing of normalized $OD_R$ and $OD_G$ are observed as the total OD value increases, especially when the total OD value is greater than 3. The trend is the most obvious for slide 25× where a large number of data points have total OD value greater than 4, indicating strong scattering effects for high DAB concentrations. Not surprisingly, the data collected from the tissue slides is much noisier than that collected from the gel slides, indicating that more complex interaction between tissue sample and the incident light may occur. Therefore, we believe gel slide is more reliable to be used to derived reference color vectors for color deconvolution.

Based on the above analysis, different color reference vectors should be used to deconvolve DAB stain at different concentrations. The methods described herein allow for the selection of an appropriate DAB color reference vector describing a specific concentration of DAB even though the actual DAB concentration used in the staining assay is unknown.

Example 5—Reference Color Selection for a Sample Stained with DAB and Hematoxylin Based on the above analysis, different reference color vectors should be used to deconvolve DAB stain at different concentration levels. However, since we do not know the DAB concentration in a stain mixture before deconvolution, we are unable to determine the reference vector directly. To address this issue, we developed a method to automatically select the DAB reference color vector from a given set that best represents the true DAB concentration in the mixture.

We consider double stain situation (i.e., only DAB and another stain, e.g., hematoxylin), for the true DAB and HTX concentration, for which the normalized reference color vector is ($\widehat{OD}_{R_{DAB}}, \widehat{OD}_{G_{DAB}}, \widehat{OD}_{B_{DAB}}$) and ($\widehat{OD}_{R_{HEM}}, \widehat{OD}_{G_{HEM}}, \widehat{OD}_{B_{HEM}}$), and have $$[A_{Hem} \ A_{DAB}] \begin{bmatrix} \widehat{OD}_{R_{DAB}} & \widehat{OD}_{G_{DAB}} & \widehat{OD}_{B_{DAB}} \\ \widehat{OD}_{R_{HEM}} & \widehat{OD}_{G_{HEM}} & \widehat{OD}_{B_{HEM}} \end{bmatrix} = \tag{10}$$

$$[OD_{R\_tissue} \ OD_{G\_tissue} \ OD_{B\_tissue}]$$

As noted herein, equation (10) is an over determined equation. $A_{Hem}$ and $A_{DAB}$ can be determined using information from only two channels. For example, by using red and green channel signal and solving equation $$[A_{Hem} \ A_{DAB}] \begin{bmatrix} \widehat{OD}_{R_{DAB}} & \widehat{OD}_{G_{DAB}} \\ \widehat{OD}_{R_{HEM}} & \widehat{OD}_{G_{HEM}} \end{bmatrix} = [OD_{R\_tissue} \ OD_{G\_tissue}] \tag{11}$$

we can obtain the values for $A_{Hem}$ and $A_{DAB}$. When the reference color vectors are for the true concentration levels, the color system is close to linear, and we can use the calculated $A_{Hem}$ and $A_{DAB}$ value to reconstruct the blue channel signal $OD_{B\_tissue}$, i.e., $$O\widehat{D}_{B_{tissue}} = A_{Hem} \cdot \widehat{OD}_{B_{HEM}} + A_{DAB} \cdot \widehat{OD}_{B_{DAB}} \tag{12}$$

where $O\widehat{D}_{B_{tissue}}$ is the reconstructed blue channel signal. The reconstruction err is $$\text{Error} = \text{abs}(OD_{B_{tissue}} - O\widehat{D}_{B_{tissue}}) \tag{13}$$

In practice, considering that scattering effects for HEM stain is negligible, we can use a fixed reference color vector for HEM stain. Thus, if we have N DAB slides which are prepared using the method as described herein, each slide represents a certain DAB concentration level, we have N pairs of DAB and HEM reference color vectors. We compute the reconstruction error for each pair of reference vectors, and the pair which yields the minimal reconstruction error is selected as the optimal pair, as described herein. There is no limitation of the number of candidate reference vector pairs. In general, larger number of DAB slides provides us wider selection of reference colors, and is expected to account for larger DAB stain variations and thus yield better color deconvolutions result.

It is also possible that instead of using blue channel signal to compute the reconstruction error, red and green channel signal can also be used. From our experiments, using the green channel for error calculation actually yielded lower average error across the tested.

Example 6—Experimental Results-Visual Assessment

Figure 11:
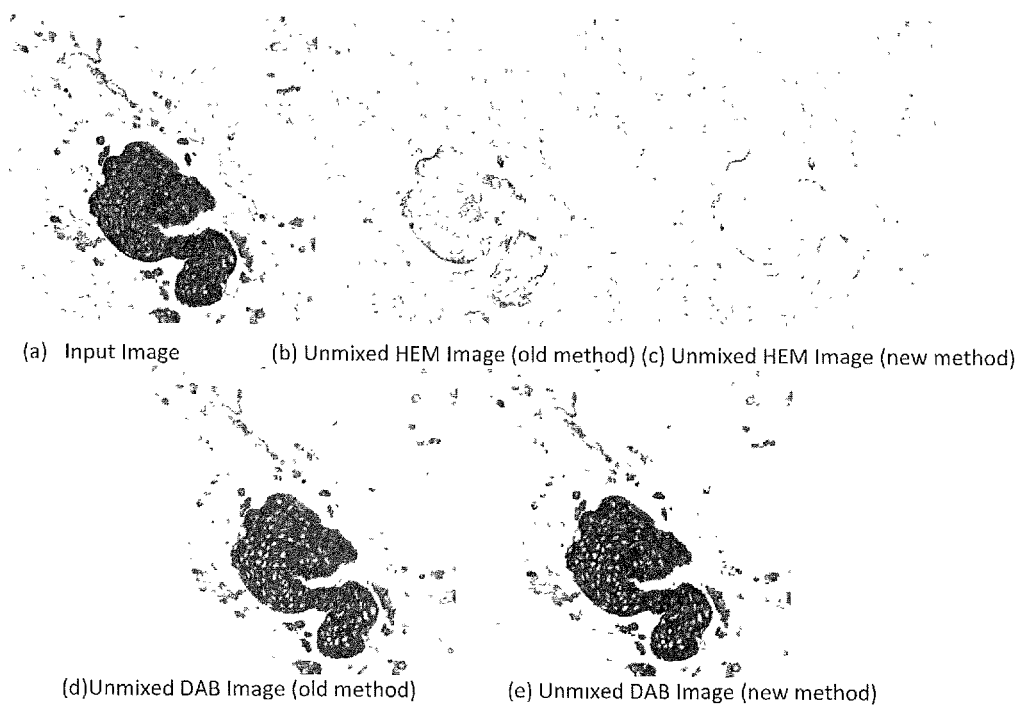
FIG. 11 sets forth a visual comparison of the results of unmixing with the presently disclosed method compared to previous methods.

FIG. 11 shows the visual comparison between the traditional method and the proposed method. The input image is a CEA (Carcinoembryonic Antigen) stained non-small cell lung cancer (NSCLC) tissue sample. It can be clearly seen that, in the region strongly stained by DAB, the new unmixed HEM image better depicts the nucleus, and the new unmixed DAB image better shows the DAB variations in the original image.

Example 7—Experimental Results-Quantified Assessment

Figure 12:
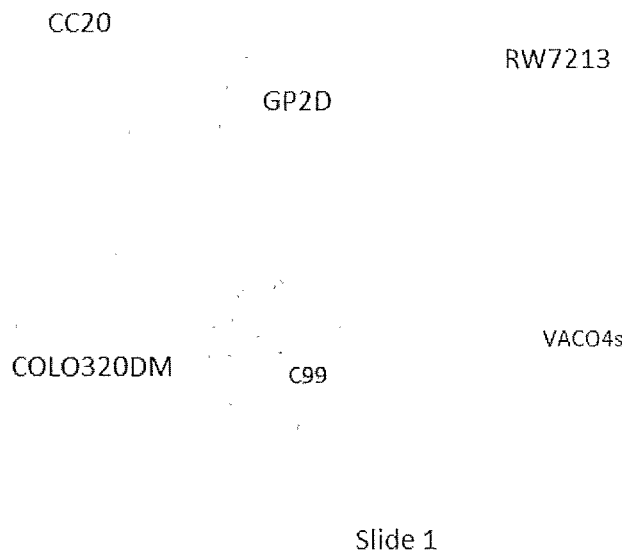
FIG. 12 illustrates thumbnail images of the two slides which hold the 12 tumor cell line.
Figure 12:
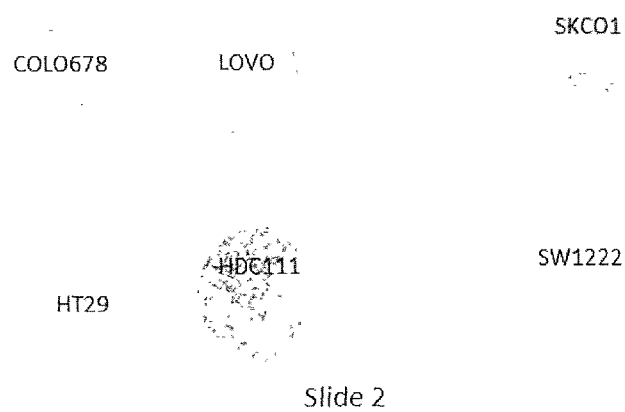
Figure 13:
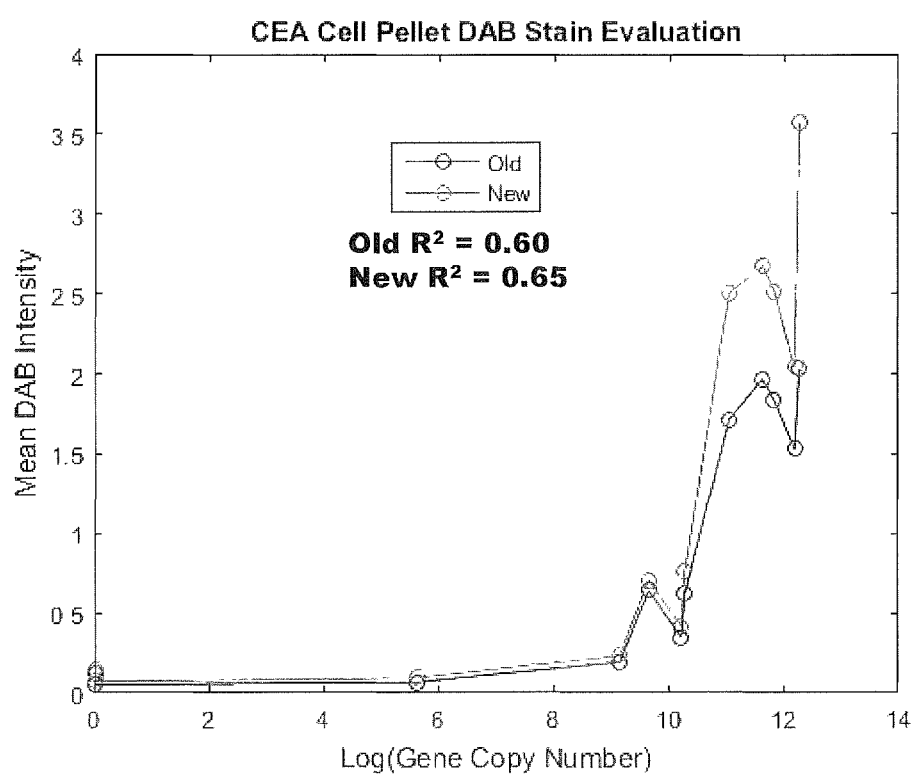
FIG. 13 sets forth the average DAB intensity of each cell line versus the logarithm of the gene copy number.

For quantified assessment, slides with tissue microarray of pellets were used. There were a total of 12 tumor cell lines, each were CEA stained using DAB, followed by counterstain using HEM. The CEA gene copy numbers determined by sequencing were provided as an indication of CEA expression level (see Table 1), TMA1 and TMA2 corresponds to slide 1 (left) and slide 2 (right), respectively. FIG. 12 shows the thumbnail image of the two slides which hold the 12 tumor cell line samples, the name of each cell line is also indicated beside each cell line. FIG. 13 shows the average DAB intensity of each cell line vs. the logarithm of the gene copy number. Logarithm is used because the range of the original gene copy number is too wide and the variation of DAB intensity can hardly be shown if plot again the original gene copy number. As shown, the new method generated similar average DAB intensities as the comparative method for low CEA expression cell lines, but yielded higher DAB intensity measurements for high CEA expression cell lines, which better correlated with the CEA gene copy numbers.

TABLE 1

| TMA1 | Cell line | CEA copy number | TMA2 | Cell line | CEA copy number |
|---|---|---|---|---|---|
| 1 | COLO320DM | 279 | 7 | HT29 | 9,429 |
| 2 | C99 | 62,615 | 8 | HDC111 | 112,561 |
| 3 | VACO4S | 214,782 | 9 | SW1222 | 29,357 |
| 4 | RW7213 | 137,971 | 10 | SKCO1 | 198,015 |
| 5 | GP2D | 15,576 | 11 | LOVO | 27,500 |
| 6 | CC20 | 1 | 12 | COLO678 | 1 |

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A method of unmixing an image of a biological specimen stained with at least two stains comprising:
   deriving total optical density values for each channel in R, G, B color space from pixel intensity values in an image or a portion of an image having a first stain and a second stain, wherein at least the first stain is a concentration-dependent stain;
   obtaining a plurality of prospective first stain color reference vectors, each of the plurality of prospective first stain color reference vectors characterizing the first stain at a different concentration;
   obtaining at least one second stain color reference vector;
   deriving a series of candidate color systems from the first stain color and second stain color reference vectors, each candidate color system comprising one of the prospective first stain color reference vectors from the plurality of prospective first stain color reference vectors and the at least one second stain color reference vector;
   selecting a color system from the series of candidate color system, the color system selected by:
      computing a reconstruction error for each candidate color space; and
      determining the candidate color space having a minimal reconstruction error; and
   unmixing the acquired image using the selected color system.

2. The method of claim 1, wherein the reconstruction error is determined by calculating an absolute difference between the derived total optical density value for a first of the channels in R, G, B color space, and a reconstructed total optical density for the first channel.

3. The method of claim 2, wherein the reconstructed total optical density for the first channel is calculated by summing:
   a product of a derived amount of the second stain present in the biological sample and a first channel optical density value for the second stain in one of the candidate color systems of the series of candidate color systems; and
   a product of a derived amount of the first stain present in the biological sample and a first channel optical density value for first stain in the same candidate color system.

4. The method of claim 3, wherein the derived amounts of the first stain and the second stain are computed by multiplying a vector of the derived total optical densities for the second and third channels in the R, B, G, color space by an inverse of a candidate reconstruction matrix, the candidate reconstruction matrix comprising:
   a first optical density vector having optical density values corresponding to the second and third channels of the first stain for the candidate color system; and
   a second optical density vector having optical density values corresponding to the second and third channels of the second stain for the candidate color system.

5. The method of claim 1, wherein the first stain is DAB.

6. The method of claim 1, wherein the second stain is selected from the group consisting of hematoxylin, eosin, fast red or methyl green.

7. The method of claim 1, wherein the first of the channels in R, G, B, color space is a blue channel or a green channel.

8. The method of claim 1, wherein the biological sample is stained with more than three stains, and where the acquired image is a region of interest derived from a larger image, the region of interest comprising only the first and second stains.

9. The method of claim 1, wherein both the first and second stains are concentration-dependent stains and wherein the at least one second stain color reference vector is a plurality of prospective second stain color reference vectors, each of the plurality of prospective second stain color reference vectors characterizing the second stain at a different concentration.

10. A system for unmixing an image of a biological specimen stained with at least two stains, the system comprising:

one or more processors; and
one or more memories coupled to the one or more processors, the one or more memories to store computer-executable instructions that, when executed by the one or more processors, cause the one or more processors to perform operations comprising:
acquiring an image of the biological sample having signals corresponding to a first stain and a second stain, wherein at least the first stain is a concentration-dependent stain;
deriving total optical density values for each channel in R, G, B color space from pixel intensity values in the acquired image;
obtaining a set of prospective first stain color reference vectors from a spectral reference database, each color reference vector within the set of prospective first stain color reference vectors characterizing the first stain at a different stain concentration;
obtaining at least one second stain color reference vector from the spectral reference database;
deriving a series of candidate color systems from the first stain and second stain color reference vectors, each candidate color system comprising one of the prospective first stain color reference vectors from the set of prospective first stain color reference vectors and the at least one second stain color reference vector;
selecting a color system from the series of candidate color system, the color system selected by:
computing a reconstruction error for each candidate color space; and
determining the candidate color space having a minimal reconstruction error; and
unmixing the signals within the acquired image using the selected color system.

11. The system of claim 10, wherein the reconstruction error is determined by calculating an absolute difference between:
the derived total optical density value for a first of the channels in R, G, B color space; and
a reconstructed total optical density for the first channel.

12. The system of claim 11, wherein the reconstructed total optical density for the first channel is calculated by summing:
a product of a derived amount of the second stain present in the biological sample and a first channel optical density value for the second stain in one of the candidate color systems of the series of candidate color systems; and
a product of a derived amount of the first stain present in the biological sample and a first channel optical density value for first stain in the same candidate color system.

13. The system of claim 12, wherein the derived amounts of the first stain and the second stain are computed by multiplying a vector of the derived total optical densities for the second and third channels in the R, B, G, color space by an inverse of a candidate reconstruction matrix, the candidate reconstruction matrix comprising:
a first optical density vector having optical density values corresponding to the second and third channels of the first stain for the candidate color system; and
a second optical density vector having optical density values corresponding to the second and third channels of the second stain for the candidate color system.

14. The imaging system of claim 10, wherein the obtaining of the set of prospective first stain color reference vectors comprises deriving a plurality of color reference vectors for the first stain by analyzing image data from a series of control slides, wherein each control slide has a different concentration of stain.

15. A non-transitory computer-readable medium storing instructions which, when executed by one or more processors of an imaging system, cause the imaging system to:
derive total optical density values for each channel in R, G, B color space from pixel intensity values in an image or a portion of an image having a first stain and a second stain, wherein at least the first stain is a concentration-dependent stain;
obtain a plurality of prospective first stain color reference vectors, each of the plurality of prospective first stain color reference vectors characterizing the first stain at a different concentration;
obtain at least one second stain color reference vector;
derive a series of candidate color systems from the first stain color and second stain color reference vectors, each candidate color system comprising one of the prospective first stain color reference vectors from the plurality of prospective first stain color reference vectors and the at least one second stain color reference vector;
select a color system from the series of candidate color system, the color system selected by:
computing a reconstruction error for each candidate color space; and
determining the candidate color space having a minimal reconstruction error; and
unmix the acquired image using the selected color system.

16. The non-transitory computer-readable medium of claim 15, wherein the reconstruction error is determined by calculating an absolute difference between the derived total optical density value for a first of the channels in R, G, B color space, and a reconstructed total optical density for the first channel.

17. The non-transitory computer-readable medium of claim 16, wherein the reconstructed total optical density for the first channel is calculated by summing:
a product of a derived amount of the second stain present in the biological sample and a first channel optical density value for the second stain in one of the candidate color systems of the series of candidate color systems; and
a product of a derived amount of the first stain present in the biological sample and a first channel optical density value for first stain in the same candidate color system.

18. The non-transitory computer-readable medium of claim 17, wherein the derived amounts of the first stain and the second stain are computed by multiplying a vector of the derived total optical densities for the second and third channels in the R, B, G, color space by an inverse of a candidate reconstruction matrix, the candidate reconstruction matrix comprising:
a first optical density vector having optical density values corresponding to the second and third channels of the first stain for the candidate color system; and
a second optical density vector having optical density values corresponding to the second and third channels of the second stain for the candidate color system.

19. The non-transitory computer-readable medium of claim 15, wherein the biological sample is stained with more than three stains, and where the acquired image is a region of interest derived from a larger image, the region of interest comprising only the first and second stains.

20. The non-transitory computer-readable medium of claim 15, wherein both the first and second stains are concentration-dependent stains and wherein the at least one second stain color reference vector is a plurality of prospective second stain color reference vectors, each of the plurality of prospective second stain color reference vectors characterizing the second stain at a different concentration.

* * * * *